US012770595B2

(12) United States Patent
Osako et al.

(10) Patent No.: US 12,770,595 B2
(45) Date of Patent: Oct. 20, 2026

(54) SIGNAL PROCESSING APPARATUS, SIGNAL PROCESSING METHOD, PROGRAM, SIGNAL PROCESSING SYSTEM, AND ENCODING APPARATUS

(71) Applicant: Sony Group Corporation, Tokyo (JP)

(72) Inventors: Keiichi Osako, Tokyo (JP); Yoshiaki Oikawa, Kanagawa (JP); Yuhki Mitsufuji, Tokyo (JP)

(73) Assignee: Sony Group Corporation, Tokyo (JP)

( * ) Notice: Subject to any disclaimer, the term of this patent is extended or adjusted under 35 U.S.C. 154(b) by 1135 days.

(21) Appl. No.: 17/782,981

(22) PCT Filed: Dec. 2, 2020

(86) PCT No.: PCT/JP2020/044857
§ 371 (c)(1),
(2) Date: Jun. 6, 2022

(87) PCT Pub. No.: WO2021/117577
PCT Pub. Date: Jun. 17, 2021

(65) Prior Publication Data

US 2023/0005460 A1 Jan. 5, 2023

(30) Foreign Application Priority Data

Dec. 13, 2019 (JP) ................................ 2019-224996

(51) Int. Cl.
*G10H 1/00* (2006.01)

(52) U.S. Cl.
CPC ......... *G10H 1/0058* (2013.01); *G10H 1/0008* (2013.01); *G10H 2210/031* (2013.01); *G10H 2240/171* (2013.01)

(58) Field of Classification Search
CPC ............... G10H 1/0058; G10H 1/0008; G10H 2210/031; G10H 2240/171
(Continued)

(56) References Cited

U.S. PATENT DOCUMENTS 5,569,869 A * 10/1996 Sone .................... G10H 1/0066 84/645
5,824,930 A * 10/1998 Ura ........................ G10H 1/344 84/171
(Continued)

FOREIGN PATENT DOCUMENTS

JP H11-288270 A 10/1999
JP 2007-181135 A 7/2007
(Continued)

OTHER PUBLICATIONS

International Search Report and English translation thereof mailed Feb. 22, 2021 in connection with International Application No. PCT/JP2020/044857.

*Primary Examiner* — Jeffrey Donels
*Assistant Examiner* — Philip G Scoles
(74) *Attorney, Agent, or Firm* — Wolf, Greenfield & Sacks, P.C.

(57) ABSTRACT

Provided is a signal processing apparatus having: a sound source separation unit configured to perform sound source separation on a mixed sound signal obtained by mixing a plurality of sound source signals; a sound source type determination unit configured to determine a type of a predetermined sound source signal obtained by the sound source separation; and an output destination control unit configured to output the predetermined sound source signal to a corresponding output device on the basis of a determination result of the sound source type determination unit.

14 Claims, 14 Drawing Sheets

(58) Field of Classification Search
USPC ........................................................ 84/602
See application file for complete search history.

(56) References Cited

U.S. PATENT DOCUMENTS

| | | | | |
|---|---|---|---|---|
| 2003/0101862 | A1* | 6/2003 | Furukawa | G10H 1/0041 84/610 |
| 2007/0121955 | A1* | 5/2007 | Johnston | H04S 7/301 381/61 |
| 2009/0003620 | A1* | 1/2009 | McKillop | H04M 1/6066 381/80 |
| 2009/0255396 | A1* | 10/2009 | Flamini | G10L 15/26 84/477 R |
| 2010/0131086 | A1* | 5/2010 | Itoyama | G10H 3/125 703/2 |
| 2010/0290630 | A1* | 11/2010 | Berardi | H04S 3/002 381/27 |
| 2011/0182441 | A1* | 7/2011 | Coffman | G06F 3/165 381/107 |
| 2012/0179279 | A1* | 7/2012 | Guetta | G11B 20/10527 700/94 |
| 2016/0029138 | A1* | 1/2016 | France | G10L 19/20 381/23 |

FOREIGN PATENT DOCUMENTS

| | | | |
|---|---|---|---|
| JP | 2011-035851 | A | 2/2011 |
| JP | 2015-125239 | A | 7/2015 |
| JP | 2015-179188 | A | 10/2015 |
| KR | 10-2011-0021083 | A | 3/2011 |
| KR | 10-2013-0075966 | A | 7/2013 |

* cited by examiner

FIG. 4

TA

| | REPRODUCTION APPARATUS 1 (AUTOMATIC PLAYING PIANO) | REPRODUCTION APPARATUS 2 (AUTOMATIC PLAYING DRUM) | REPRODUCTION APPARATUS 3 (AUTOMATIC PLAYING BASS) | REPRODUCTION APPARATUS 4 (AUTOMATIC PLAYING SAXOPHONE) |
|---|---|---|---|---|
| SOUND SOURCE SIGNAL AS1 (PIANO) | 1.0 | Mute | Mute | Mute |
| SOUND SOURCE SIGNAL AS2 (DRUM) | Mute | 1.0 | Mute | Mute |
| SOUND SOURCE SIGNAL AS3 (BASS) | Mute | Mute | 1.0 | Mute |
| SOUND SOURCE SIGNAL AS4 (SAXOPHONE) | Mute | Mute | Mute | 1.0 |

TA1

| | SPEAKER SP | REPRODUCTION APPARATUS 3 (AUTOMATIC PLAYING BASS) |
|---|---|---|
| SOUND SOURCE SIGNAL AS1 (PIANO) | 0.33 | Mute |
| SOUND SOURCE SIGNAL AS2 (DRUM) | 0.33 | Mute |
| SOUND SOURCE SIGNAL AS3 (BASS) | Mute | 1.0 |
| SOUND SOURCE SIGNAL AS4 (SAXOPHONE) | 0.34 | Mute |

TA2

| | SPEAKER OR HEADPHONE | REPRODUCTION APPARATUS 3 (AUTOMATIC PLAYING BASS) |
|---|---|---|
| SOUND SOURCE SIGNAL AS1 (PIANO) | 0.33 | Mute |
| SOUND SOURCE SIGNAL AS2 (DRUM) | 0.33 | Mute |
| SOUND SOURCE SIGNAL AS3 (BASS) | Mute | Mute |
| SOUND SOURCE SIGNAL AS4 (SAXOPHONE) | 0.34 | Mute |

SIGNAL PROCESSING APPARATUS, SIGNAL PROCESSING METHOD, PROGRAM, SIGNAL PROCESSING SYSTEM, AND ENCODING APPARATUS

CROSS-REFERENCE TO RELATED APPLICATIONS

This application claims the benefit under 35 U.S.C. § 371 as a U.S. National Stage Entry of International Application No. PCT/JP2020/044857, filed in the Japanese Patent Office as a Receiving Office on Dec. 2, 2020, which claims priority to Japanese Patent Application Number JP2019-224996, filed in the Japanese Patent Office on Dec. 13, 2019, each of which is hereby incorporated by reference in its entirety.

TECHNICAL FIELD

The present disclosure relates to a signal processing apparatus, a signal processing method, a program, a signal processing system, and an encoding apparatus.

BACKGROUND ART

A so-called automatic playing musical instrument that automatically performs performance in accordance with an input audio signal is known. For example, Patent Document 1 below describes a system that branches an audio signal, performs automatic playing of a violin with one audio signal, and reproduces the other audio signal with a dynamic speaker.

CITATION LIST

Patent Document

Patent Document 1: Japanese Patent Application Laid-Open No. 2011-35851

SUMMARY OF THE INVENTION

Problems to be Solved by the Invention

Common music signals include various types of sounds such as voice, a percussion instrument, a wind instrument, and electronic sound in addition to the violin. The technique described in Patent Document 1 has a problem that these sounds are mixed into an automatic performance channel of a violin.

One object of the present disclosure is to provide a signal processing apparatus and the like capable of reproducing a sound source signal by an automatic playing musical instrument corresponding to the sound source signal in a case where a plurality of sound source signals is included.

Solutions to Problems

The present disclosure is, for example, a signal processing apparatus including:

a sound source separation unit configured to perform sound source separation on a mixed sound signal obtained by mixing a plurality of sound source signals;

a sound source type determination unit configured to determine a type of a predetermined sound source signal obtained by the sound source separation; and an output destination control unit configured to output a predetermined sound source signal to a corresponding output device on the basis of a determination result of the sound source type determination unit.

The present disclosure is, for example, a signal processing method including:

performing, by a sound source separation unit, sound source separation on a mixed sound signal obtained by mixing a plurality of sound source signals;

determining, by a sound source type determination unit, a type of a predetermined sound source signal obtained by the sound source separation; and outputting, by an output destination control unit, a predetermined sound source signal to a corresponding output device on the basis of a determination result of the sound source type determination unit.

The present disclosure is, for example, a program causing a computer to execute a signal processing method including:

performing, by a sound source separation unit, sound source separation on a mixed sound signal obtained by mixing a plurality of sound source signals;

determining, by a sound source type determination unit, a type of a predetermined sound source signal obtained by the sound source separation; and outputting, by an output destination control unit, a predetermined sound source signal to a corresponding output device on the basis of a determination result of the sound source type determination unit.

The present disclosure is, for example, a signal processing system including: a transmission apparatus and a reception apparatus, in which the transmission apparatus includes:

a sound source separation unit configured to perform sound source separation on a mixed sound signal obtained by mixing a plurality of sound source signals;

a sound source type determination unit configured to determine a type of a predetermined sound source signal obtained by the sound source separation, and the reception apparatus is configured to output a predetermined sound source signal to an output device for the type determined by the sound source type determination unit.

The present disclosure is, for example, an encoding apparatus including an encoding unit that encodes a plurality of sound source signals obtained by performing sound source separation on a mixed sound signal obtained by mixing a plurality of sound source signals, and generates a bit stream including sound source type information indicating a type of each of the plurality of sound source signals and information indicating a reproduction position of each of the plurality of sound source signals.

BRIEF DESCRIPTION OF DRAWINGS

FIG. 4 is a diagram illustrating an example of a table indicating reproduction gains according to the first embodiment.

MODE FOR CARRYING OUT THE INVENTION

Hereinafter, embodiments and the like of the present disclosure will be described with reference to the drawings. Note that the description will be given in the following order.

Problems to Be Considered in the Present Disclosure

<First Embodiment>
<Second Embodiment>
<Third Embodiment>
<Fourth Embodiment>
<Fifth Embodiment>
<Sixth Embodiment>
<Modification Example>

The embodiments and the like described below are suitable specific examples of the present disclosure, and the contents of the present disclosure are not limited to these embodiments and the like.

Problems to be Considered in the Present Disclosure

First, problems to be considered in the present disclosure will be described in order to facilitate understanding of the present disclosure.

Techniques for playing an actual musical instrument by inputting reproduction data without human hands, such as an automatic playing piano and an automatic playing guitar, have been developed. According to such a technique, unlike music reproduction by a speaker, it is possible to obtain the sound and sound quality of the musical instrument itself by directly playing the musical instrument. However, since the automatic playing musical instrument can output only the sound of the musical instrument itself, the reproduction data also needs to be only the musical instrument sound. However, general music includes a plurality of musical instruments, and it is impossible to enjoy these pieces by an automatic playing musical instrument. Specifically, in the technique described in Patent Document 1 described above, the sounds are mixed into the automatic playing channel of the violin. Mixing of a signal other than the vibration component of the string of the violin, that is, a signal of a percussion instrument or an electronic sound also has to be reproduced by string vibration, which causes a problem that the sound quality of the sound reproduced by the violin is significantly deteriorated. In general, most music contents distributed in the world are stereo-mixed, and reproduction data of only the violin cannot be prepared. Therefore, it has been difficult to avoid the above-described problem.

Therefore, in the present disclosure, it is realized that music data including various musical instruments is reproduced using a plurality of types of automatic playing musical instruments. As a result, for example, it is possible to realize a music reproduction system in which an orchestra includes all automatic playing musical instruments. Furthermore, a unique reproduction system can be constructed by combining speakers and headphones, or a support system can be constructed when the user himself/herself practices playing a musical instrument. Hereinafter, embodiments of the present disclosure made in view of these points will be described.

First Embodiment

[Overview]

Figure 1:
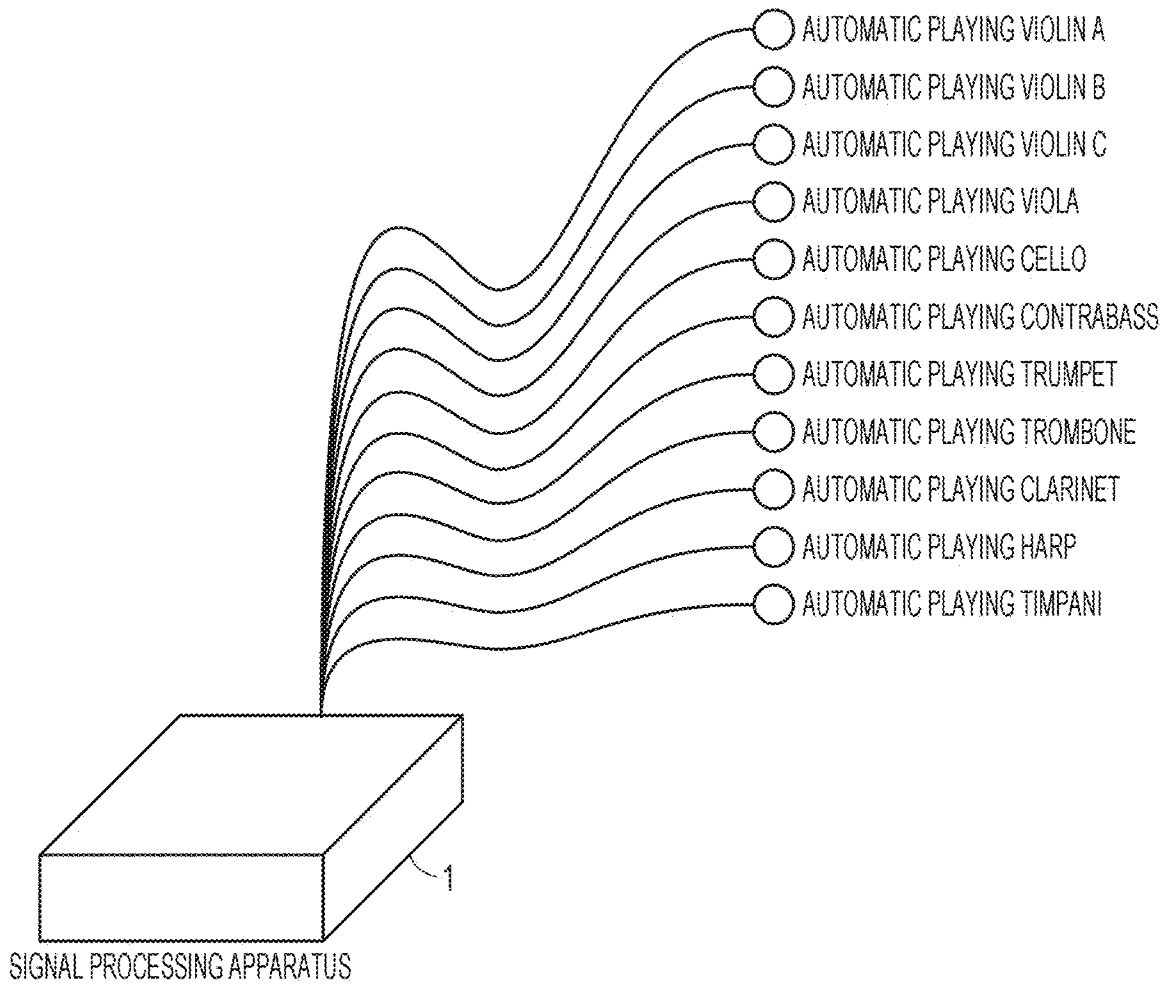
FIG. 1 is a diagram to be referred to when an outline of a first embodiment is explained.

FIG. 1 is a diagram for explaining a first embodiment. As illustrated in FIG. 1, a reproduction system according to the present embodiment includes a signal processing apparatus 1. An output device (reproduction apparatus) that outputs sound is connected to the signal processing apparatus 1. The output device is, for example, an automatic playing musical instrument. The output device may be a speaker, headphones, a robot that outputs a specific sound, or the like. In FIG. 1, as examples of the automatic playing musical instruments connected to the signal processing apparatus 1, "automatic playing violin A", "automatic playing violin B", "automatic playing violin C", "automatic playing viola", "automatic playing cello", "automatic playing contrabass", "automatic playing trumpet", "automatic playing trombone", "automatic playing clarinet", "automatic playing harp", and "automatic playing timpani" are illustrated. The automatic playing musical instruments connected to the signal processing apparatus 1 may be all different types of automatic playing musical instruments, or may be partially the same type of automatic playing musical instruments. Note that, in the present embodiment, an example is assumed in which the signal processing apparatus 1 and each automatic playing musical instrument are connected by wire.

Although details will be described later, the signal processing apparatus 1 generates an audio signal dedicated to each automatic playing musical instrument. Then, the generated audio signal is output to the corresponding automatic playing musical instrument. The automatic playing musical instrument operates on the basis of the audio signal supplied from the signal processing apparatus 1 and reproduces the audio signal. As a result, it is possible to listen to an orchestra that has been conventionally heard by a speaker or headphones with the sound of the musical instrument itself. Moreover, even if there is no performer of each musical instrument, it is possible to enjoy the performance of the orchestra.

[Configuration Example of Reproduction System]

Figure 2:
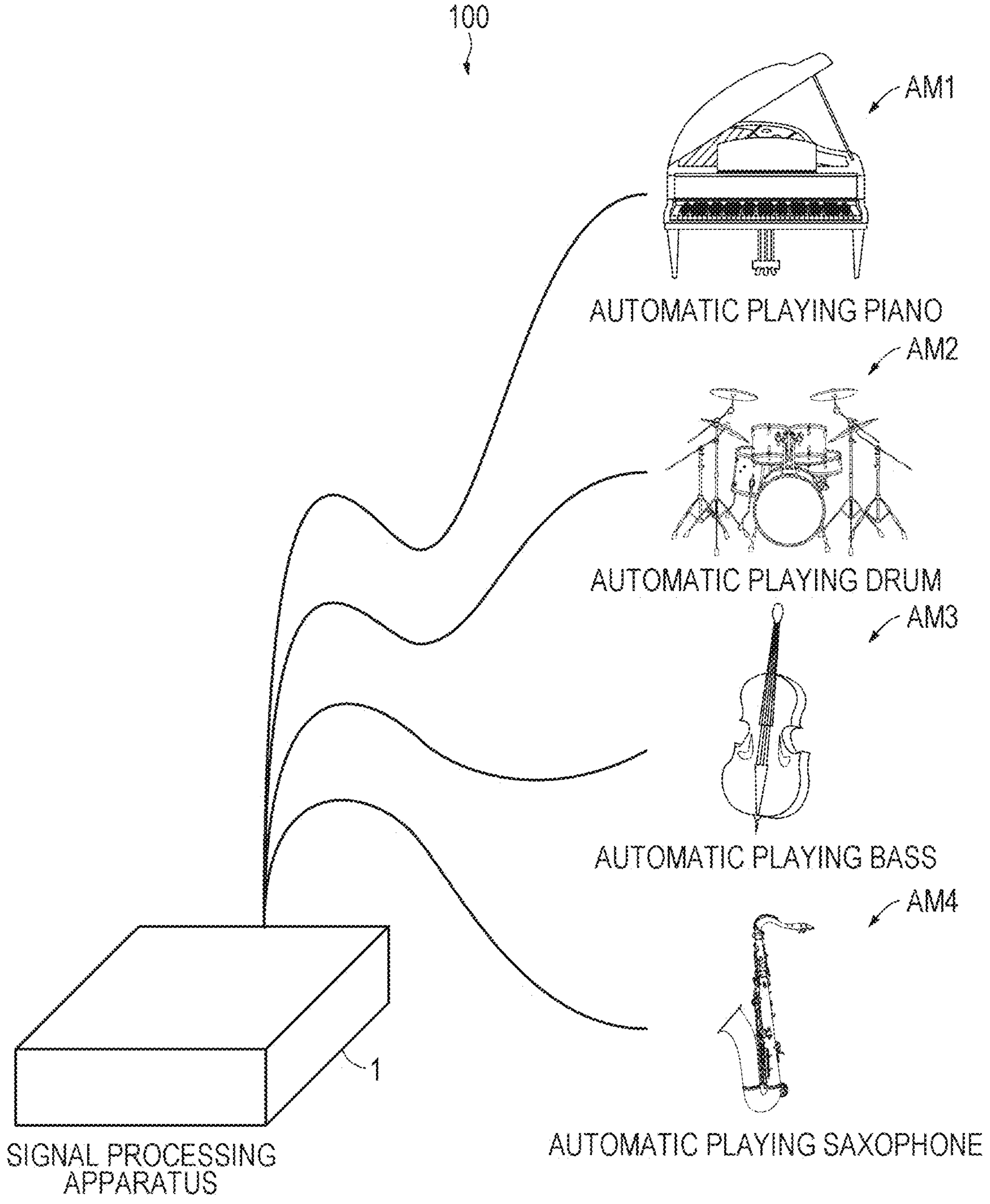
FIG. 2 is a diagram illustrating a specific example of the reproduction system according to the first embodiment.

FIG. 2 is a diagram illustrating a specific example of the reproduction system (reproduction system 100) according to the first embodiment. As illustrated in FIG. 2, in the first embodiment, four automatic playing musical instruments (automatic playing piano AM1, automatic playing drum AM2, automatic playing bass AM3, and automatic playing saxophone AM4) are connected to the signal processing apparatus 1. As a matter of course, the type of the automatic playing musical instrument may be another automatic playing musical instrument, and the number of connections of the automatic playing musical instrument can be changed as appropriate.

Figure 3:
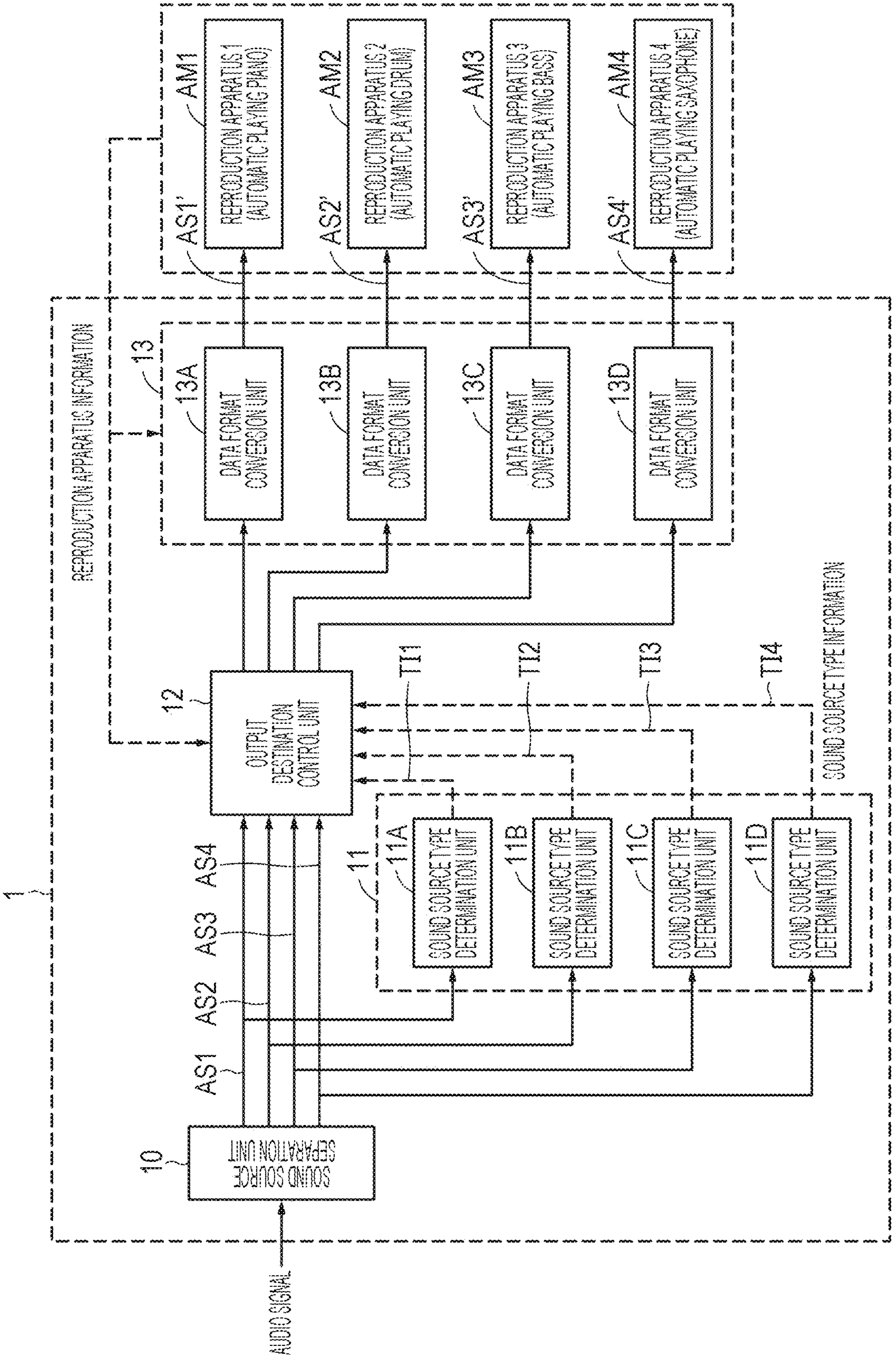
FIG. 3 is a diagram for explaining an internal configuration example of a signal processing apparatus according to the first embodiment.

FIG. 3 is a diagram for explaining an internal configuration example of the signal processing apparatus 1. The signal processing apparatus 1 has, for example, a sound source separation unit 10, a sound source type determination unit 11, an output destination control unit 12, and a data format conversion unit 13. The sound source type determination unit 11 has four sound source type determination units (sound source type determination units 11A, 11B, 11C, and 11D). The data format conversion unit 13 has four data format conversion units (data format conversion units 13A, 13B, 13C, and 13D).

An audio signal is input into the signal processing apparatus 1. The audio signal is a mixed sound signal obtained by mixing a plurality of sound source signals. Specifically, the audio signal is a sound source signal for an automatic playing musical instrument connected to the signal processing apparatus 1, that is, a mixed sound signal in which a piano sound source signal, a drum sound source signal, a bass sound source signal, and a saxophone sound source signal are mixed. The audio signal may be a signal saved in a recording medium including an optical recording medium such as a compact disc (CD), a magnetic recording medium such as a hard disk drive (HDD), or a solid state drive (SSD) semiconductor recording medium, or may be stream data distributed via a network such as the Internet.

The sound source separation unit 10 performs sound source separation on the audio signal that is the mixed sound signal. As a sound source separation method, a known sound source separation method can be applied. For example, as a sound source separation method, it is possible to apply the method described in WO2018/047643 previously proposed by the applicant of the present disclosure, a method using independent component analysis, or the like. By the sound source separation performed by the sound source separation unit 10, the audio signal is separated into tracks for each musical instrument sound source, that is, a sound source signal for each musical instrument. Specifically, the audio signal is separated into a piano sound source signal, a drum sound source signal, a bass sound source signal, and a saxophone sound source signal. Note that the number of separated sound sources (in the present embodiment, the number of sound sources is four) is stored in an appropriate memory as the number N of sound sources (variable).

Each sound source signal obtained by the sound source separation is supplied to the sound source type determination unit 11. For example, a sound source signal AS1 which is a piano sound source signal is supplied to a sound source type determination unit 11A, a sound source signal AS2 which is a drum sound source signal is supplied to a sound source type determination unit 11B, a sound source signal AS3 which is a bass sound source signal is supplied to a sound source type determination unit 11C, and a sound source signal AS4 which is a saxophone sound source signal is supplied to a sound source type determination unit 11D. Furthermore, each sound source signal is also supplied to the output destination control unit 12.

The sound source type determination unit 11 determines the type of a predetermined sound source signal obtained by the sound source separation. As a sound source type determination method, the method described in "Tetsuro Kitahara, Masataka Goto, Kazunori Komatani, Tetsuya Ogata, and Hiroshi G. Okuno, "Instrument Identification in Polyphonic Music: Feature Weighting to Minimize Influence of Sound Overlaps," EURASIP Journal on Advances in Signal Processing, Special Issue on Music Information Retrieval based on Signal Processing, Vol. 2007, No. 51979, pp. 1-15, 2007.", or a sound source type determination method using a machine learning technique represented by a deep neural network can be applied. The sound source type determination unit 11A determines that the type of the musical instrument for the sound source signal AS1 is "piano". The sound source type determination unit 11B determines that the type of the musical instrument for the sound source signal AS2 is "drum". The sound source type determination unit 11C determines that the type of the musical instrument for the sound source signal AS3 is "bass". The sound source type determination unit 11D determines that the type of the musical instrument for the sound source signal AS4 is "saxophone". Note that the sound source type determination unit for the number of sound source signals is provided in FIG. 3, but one sound source type determination unit may repeatedly perform the sound source type determination by the number of times of the number of sound sources. Sound source type information indicating the type of the musical instrument determined by the sound source type determination unit 11 is supplied to the output destination control unit 12. For example, sound source type information TI1 indicating that the type of the musical instrument for the sound source signal AS1 is "piano" is supplied to the output destination control unit 12. Sound source type information TI2 indicating that the type of the musical instrument for the sound source signal AS2 is "drum" is supplied to the output destination control unit 12. For example, sound source type information T13 indicating that the type of the musical instrument for the sound source signal AS3 is "bass" is supplied to the output destination control unit 12. For example, sound source type information 114 indicating that the type of the musical instrument for the sound source signal AS4 is "saxophone" is supplied to the output destination control unit 12.

The output destination control unit 12 outputs a predetermined sound source signal to the corresponding output device on the basis of the determination result of the sound source type determination unit 11. The output devices according to the present embodiment are an automatic playing piano AM1, an automatic playing drum AM2, an automatic playing bass AM3, and an automatic playing saxophone AM4. Note that specific contents of the processing performed by the output destination control unit 12 will be described later.

The data format conversion unit 13 converts the sound source signal into a data format (e.g., musical instrument digital interface (MIDI) or musical score information) that can be reproduced by the output device. For example, a data format conversion unit 13A converts the sound source signal AS1 into a data format in which the automatic playing piano AM1 can play. A sound source signal AS1' is generated by such conversion processing. A data format conversion unit 13B converts a sound source signal AS2 into a data format in which the automatic playing drum AM2 can play. A sound source signal AS2' is generated by such conversion processing. A data format conversion unit 13C converts a sound source signal AS3 into a data format in which the automatic playing bass AM3 can play. A sound source signal AS3' is generated by such conversion processing. A data format conversion unit 13D converts a sound source signal AS4 into a data format in which the automatic playing saxophone AM4 can play. A sound source signal AS4' is generated by such conversion processing.

The sound source signal AS1' is supplied to the automatic playing piano AM1. Then, the sound source signal AS1' is reproduced by the automatic playing piano AM1. The sound source signal AS2' is supplied to the automatic playing drum AM2. Then, the sound source signal AS2' is reproduced by the automatic playing drum AM2. The sound source signal AS3' is supplied to the automatic playing bass AM3. Then, the sound source signal AS3' is reproduced by the automatic playing bass AM3. The sound source signal AS4' is supplied to the automatic playing saxophone AM4. Then, the sound source signal AS4' is reproduced by the automatic playing saxophone AM4. As described above, in the present embodiment, the sound source signal for each musical instrument included in the audio signal can be reproduced by the corresponding automatic playing musical instrument, and it is possible to create an environment as if the user were listening to an orchestra.

Note that, in order for the output destination control unit 12 to output each sound source signal to the corresponding automatic playing musical instrument, it is necessary to identify in advance the type of each automatic playing musical instrument. Thereupon, the reproduction apparatus information is supplied from each automatic playing musical instrument to the output destination control unit 12. The reproduction apparatus information includes at least information indicating the type of the musical instrument, and is information including a reproducible data format and the like in the present embodiment. The output destination control unit 12 performs control to output the sound source signal to the corresponding automatic playing musical instrument on the basis of the reproduction apparatus information. Note that the reproduction apparatus information is also supplied to the data format conversion unit 13. The data format conversion unit 13 determines a data format reproducible by the automatic playing musical instrument on the basis of the reproduction apparatus information, and switches an appropriate data format conversion unit (in this example, the data format conversion units 13A to 13D).

As one example, the reproduction gain for each sound source signal is tabulated for each automatic playing musical instrument. An example of such a table (table TA) is illustrated in FIG. 4. The table TA represents a relationship of an input/output level. For example, the output destination control unit 12 refers to the table TA and sets the reproduction gain of the sound source signal to be output to the data format conversion unit 13A to "1.0" for the sound source signal AS1 and to "mute" for the sound source signals AS2 to AS4. As a result, sound source signals other than the piano sound source signal can be prevented from being output to the data format conversion unit 13A and the automatic playing piano AM1. Moreover, the output destination control unit 12 refers to the table TA and sets the reproduction gain of the sound source signal to be output to the data format conversion unit 13B to "1.0" for the sound source signal AS2 and to "mute" for the sound source signals AS1, AS3, and AS4. As a result, sound source signals other than the drum sound source signal can be prevented from being output to the data format conversion unit 13B and the automatic playing drum AM2. Furthermore, the output destination control unit 12 refers to the table TA and sets the reproduction gain of the sound source signal to be output to the data format conversion unit 13C to "1.0" for the sound source signal AS3 and to "mute" for the sound source signals AS1, AS2, and AS4. As a result, sound source signals other than the bass sound source signal can be prevented from being output to the data format conversion unit 13C and the automatic playing bass AM3. Moreover, the output destination control unit 12 refers to the table TA and sets the reproduction gain of the sound source signal to be output to the data format conversion unit 13D to "1.0" for the sound source signal AS4 and to "mute" for the sound source signals AS1 to AS3. As a result, sound source signals other than the saxophone sound source signal can be prevented from being output to the data format conversion unit 13D and the automatic playing saxophone AM4.

Note that, in the above description, an example, in which the output destination is controlled by gain adjustment by digital signal processing, has been described, but the present invention is not limited thereto. For example, by performing appropriate switch control, only the sound source signal AS1 may be supplied to the data format conversion unit 13A. Furthermore, the content (gain value) of the table TA may be rewritable by the user. Since the gain can be rewritten, it is possible to balance sounds reproduced by a plurality of automatic playing musical instruments. Furthermore, even in a case where the same automatic playing musical instrument is connected to the signal processing apparatus 1, the gain can be set similarly to the table TA. Furthermore, although the configuration in which the data format conversion unit 13 has a plurality of functional blocks (data format conversion units 13A to 13D) has been described, one data format conversion unit may sequentially perform data conversion by changing an algorithm on the basis of the reproduction apparatus information.

[Processing Flow]

Next, one example of processing performed in the signal processing apparatus 1 according to the first embodiment will be described with reference to FIGS. 5 and 6. In step ST11 in the flowchart of FIG. 5, the audio signal as the mixed sound signal is read by the sound source separation unit 10. Then, the processing proceeds to step ST12.

In step ST12, the sound source separation unit 10 performs sound source separation. By this processing, the sound source signals AS1 to AS4 are obtained. The sound source signals AS1 to AS4 are each output to the sound source type determination unit 11 and the output destination control unit 12. Then, the processing proceeds to step ST13.

In step ST13, for example, the number N of sound sources (in this example, N=4), which is the number of separated sound source signals, is stored in an appropriate memory included in the sound source type determination unit 11. Then, the processing proceeds to step ST14.

In step ST14, it is determined whether or not the type of the separated sound source i has been determined. Specifically, for example, the sound source type determination unit 11 judges whether or not the type of the musical instrument corresponding to each sound source signal has been determined. In a case where the type of the separated sound source i has not been determined, the processing proceeds to step ST15.

In step ST15, sound source type determination processing of determining the type of the musical instrument corresponding to the sound source signal is performed. This processing is repeated until all sound source signal types have been determined, i.e. starting from i=1 until i=N (=4). Then, the processing proceeds to step ST16.

In step ST16, the type of the sound source i is determined. Specifically, the type of the automatic playing musical instrument corresponding to the sound source signal AS1 is determined as "piano". Furthermore, the type of the automatic playing musical instrument corresponding to the sound source signal AS2 is determined as "drum", the type of the automatic playing musical instrument corresponding to the sound source signal AS3 is determined as "bass", and the type of the automatic playing musical instrument corresponding to the sound source signal AS4 is determined as "saxophone". Then, the processing proceeds to step ST17.

In step ST17, when i=4 is satisfied, the sound source type determination processing ends. Then, the processing proceeds to step ST18.

In step ST18, output destination control processing is executed. Specific contents of the output destination control processing will be described later. Then, the processing proceeds to step ST19.

In step ST19, the data format conversion unit 13 performs data format conversion processing. The data format conversion unit 13 converts the sound source signals AS1 to AS4 into a data format that can be reproduced by the corresponding automatic playing musical instrument on the basis of the reproduction apparatus information. This processing is repeated until the data formats of all the sound source signals are converted, that is, from i=1 to i=4. Then, the processing proceeds to step ST20.

In step ST20, the data format of the sound source i is converted by the data format conversion processing. Specifically, the sound source signal AS1 is converted into a sound source signal AS1' in a data format that can be reproduced by the automatic playing piano AM1. In addition, the sound source signal AS2 is converted into a sound source signal AS2' in a data format that can be reproduced by the automatic playing drum AM2. Moreover, the sound source signal AS3 is converted into a sound source signal AS3' in a data format that can be reproduced by the automatic playing bass AM3. Furthermore, the sound source signal AS4 is converted into a sound source signal AS4' in a data format that can be reproduced by the automatic playing saxophone AM4. Then, the processing proceeds to step ST21.

In step ST21, when i=4 is satisfied, the data format conversion processing ends. Then, the processing proceeds to step ST22.

In step ST22, each sound source signal is reproduced by the corresponding automatic playing musical instrument. Then, the processing ends.

Figure 5:
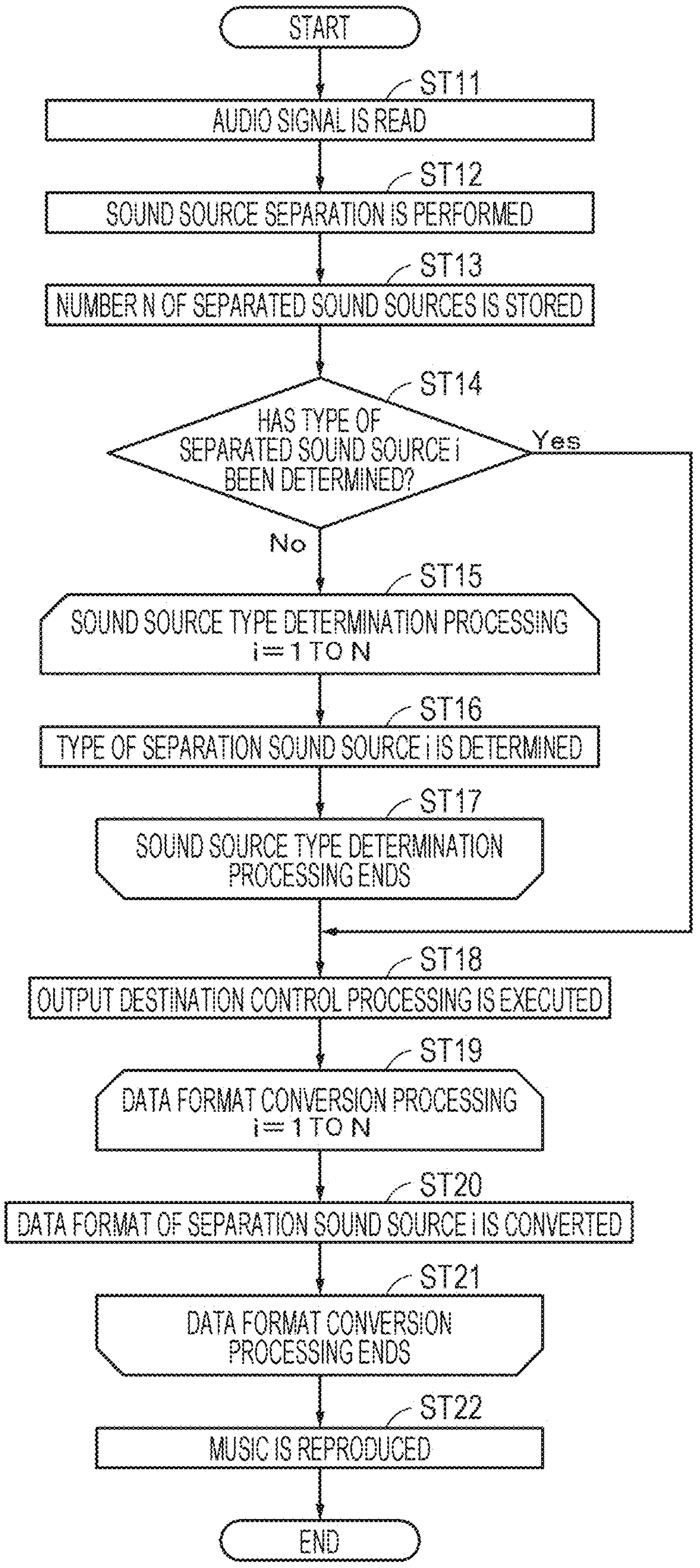
FIG. 5 is a flowchart that is referred to when one example of processing performed by the signal processing apparatus according to the first embodiment is explained.
Figure 6:
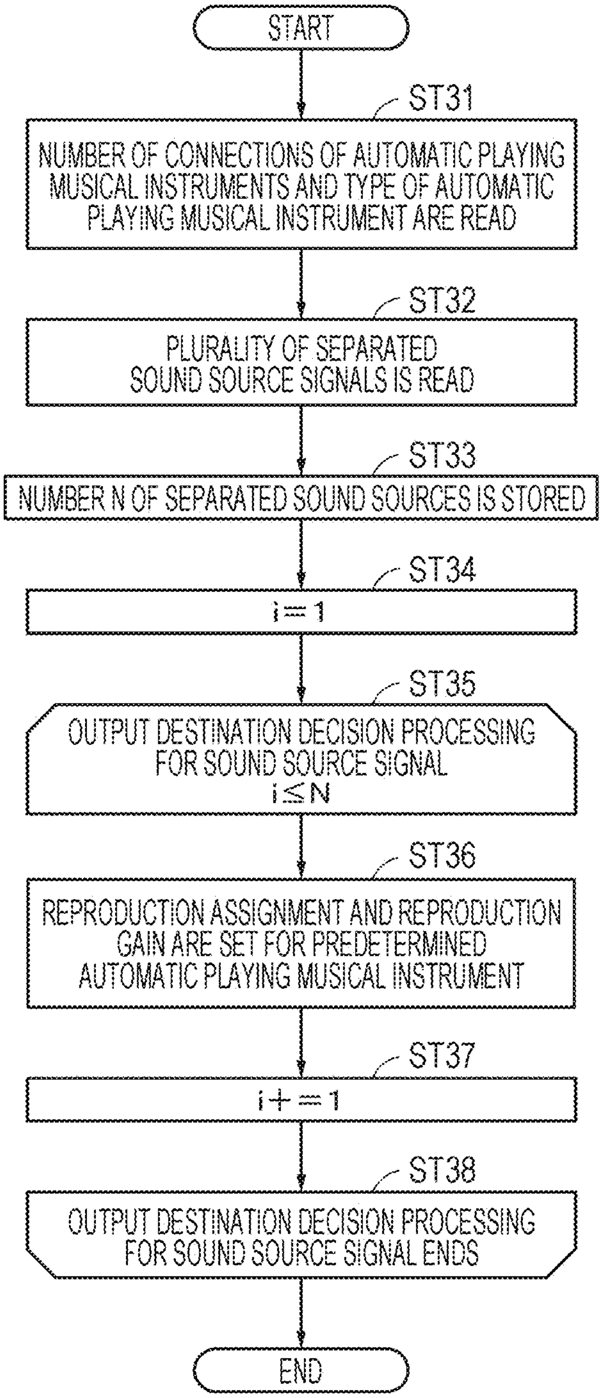
FIG. 6 is a flowchart that is referred to when one example of processing performed by the signal processing apparatus according to the first embodiment is explained.

Note that the series of processing illustrated in the flowchart of FIG. 5 may be performed in units of frames, or may be batch processing in which each automatic playing musical instrument reproduces the sound source signal at a predetermined timing after all the data of the separated sound source signals are converted. Furthermore, the processing unit for sound source separation and the processing unit for determining the sound source type may be different. For example, in a case where the frame required to perform the sound source separation is several tens of milliseconds to several hundreds of milliseconds, the type of the sound source signal may be determined using data of several frames to several tens of frames. However, in this case, it is assumed that the type of the separated sound source signal has not yet been determined even though the sound source separation is performed. Therefore, the type of the sound source signal may be determined by pre-reading (buffering) the data in advance.

Note that, depending on a sound source separation algorithm, a musical instrument that appears for each track at the time of separation may be decided. For example, there is a case where there is a dedicated parameter for each track, and the type of the sound source signal output for each track is decided in advance, such as a drum for the track Tr1 and a bass for the track Tr2. In this case, the sound source signal is obtained by the sound source separation by the sound source separation unit 10, and the type of the sound source signal can also be determined. Therefore, in the present embodiment, in step ST14, it is judged whether or not the type of the separated sound source i has been determined. In a case where the type of the sound source signal can be determined together with the sound source separation, the judgement result of step ST14 is Yes. In this case, the processing by the sound source type determination unit 11 is passed, and the processing proceeds to step ST18.

Next, the output destination control processing performed in step ST18 will be described. When the processing is started, in step ST31 of FIG. 6, the number of connections and types of the automatic playing musical instruments are read by the output destination control unit 12. The output destination control unit 12 determines the number of connections and types of the automatic playing musical instruments on the basis of the reproduction apparatus information. Then, the processing proceeds to step ST32.

In step ST32, the sound source signal separated by the sound source separation is read by the output destination control unit 12. That is, the sound source signals AS1 to AS4, which are the outputs of the sound source separation unit 10, are supplied to the output destination control unit 12. The sound source signals AS1 to AS4 buffered in an appropriate memory may be read by the output destination control unit 12. Then, the processing proceeds to step ST33.

In step ST33, the number N of sound sources separated by the output destination control unit 12 is stored. In this example, the number N of sound sources (N=4) is stored. Then, the processing proceeds to step ST34.

In step ST34, a variable i corresponding to the separated sound source signal is set to i=1. Then, the processing proceeds to step ST35.

In step ST35, output destination decision processing of the sound source signal is performed. The output destination decision processing is repeated for all the sound source signals, that is, until the variable i=N (N=4 in this example) is satisfied. Then, the processing proceeds to step ST36.

In step ST36, specific output destination decision processing is performed. For example, the output destination control unit 12 can determine that the type of the musical instrument corresponding to the sound source signal AS1 is "piano" on the basis of the sound source type information TI1. Moreover, the output destination control unit 12 can distinguish that the predetermined output device is the automatic playing piano AM1 on the basis of the reproduction apparatus information. Therefore, the output destination control unit 12 assigns the sound source signal AS1 to the automatic playing piano AM1. Then, the output destination control unit 12 sets a reproduction gain. Specifically, the output destination control unit 12 sets the gain of the sound source signal AS1 to be output to the automatic playing piano AM1 to "1.0" and sets the gains of other sound source signals AS2 to AS4 to "mute" with reference to the table TA illustrated in FIG. 4. Then, the processing proceeds to step ST37, and the variable i is incremented.

The value of the variable i does not match the number N of sound sources. Therefore, the processing of step ST36 is repeated, and the output destination decision processing for the next sound source signal AS2 is performed. The output destination control unit 12 assigns the sound source signal AS2 of which the type of the musical instrument is "drum" to the automatic playing drum AM2 on the basis of the sound source type information TI2 and the reproduction apparatus information. Then, the output destination control unit 12 sets a reproduction gain. Specifically, the output destination control unit 12 sets the gain of the sound source signal AS2 to be output to the automatic playing drum AM2 to “1.0” and sets the gains of the other sound source signals AS1, AS3, and AS4 to “mute ” with reference to the table TA illustrated in FIG. 4. Then, the processing proceeds to step ST37, and the variable i is incremented.

The value of the variable i does not match the number N of sound sources. Therefore, the processing of step ST36 is repeated, and the output destination decision processing for the next sound source signal AS3 is performed. The output destination control unit 12 assigns the sound source signal AS3 of which the type of the musical instrument is “bass” to the automatic playing bass AM3 on the basis of the sound source type information T13 and the reproduction apparatus information. Then, the output destination control unit 12 sets a reproduction gain. Specifically, the output destination control unit 12 sets the gain of the sound source signal AS3 to be output to the automatic playing bass AM3 to “1.0” and sets the gains of other sound source signals AS1, AS2, and AS4 to “mute” with reference to the table TA illustrated in FIG. 4. Then, the processing proceeds to step ST37, and the variable i is incremented.

The value of the variable i does not match the number N of sound sources. Therefore, the processing of step ST36 is repeated, and the output destination decision processing for the next sound source signal AS4 is performed. The output destination control unit 12 assigns the sound source signal AS4 of which the type of the musical instrument is “saxophone” to the automatic playing saxophone AM4 on the basis of the sound source type information T14 and the reproduction apparatus information. Then, the output destination control unit 12 sets a reproduction gain. Specifically, the output destination control unit 12 sets the gain of the sound source signal AS4 to be output to the automatic playing saxophone AM4 to “1.0” and sets the gains of other sound source signals AS1 to AS3 to “mute” with reference to the table TA illustrated in FIG. 4. Then, the processing proceeds to step ST37, and the variable i is incremented. When the value of the variable i matches the number N of sound sources, the processing proceeds to step ST38, and the output destination control processing of the sound source signal ends.

Note that the user may determine the type of the sound source signal by actually listening to the separated sound source signal. The user can also set the gain adjustment in the output destination control unit 12 on the basis of the determination result.

[Effects Obtained by the Present Embodiment]

According to the present embodiment described above, for example, it is possible to obtain the following effects.

Among the sound source signals separated by the sound source separation, only the sound source signal corresponding to the automatic playing musical instrument can be input to the automatic playing musical instrument. Since an unnecessary signal is not supplied to the automatic playing musical instrument, the sound quality of the reproduction sound can be improved.

Moreover, since an automatic playing musical instrument can be used, sound reproduction by an actual musical instrument can be performed, and realistic feeling can be improved as compared with sound reproduction by only a speaker.

Second Embodiment

Next, a second embodiment will be described. Note that, in the description of the second embodiment, the same or similar configurations in the above description are denoted by the same reference signs, and redundant description is omitted as appropriate. Moreover, the items described in the first embodiment can be applied to the second embodiment unless otherwise specified.

Figure 7:
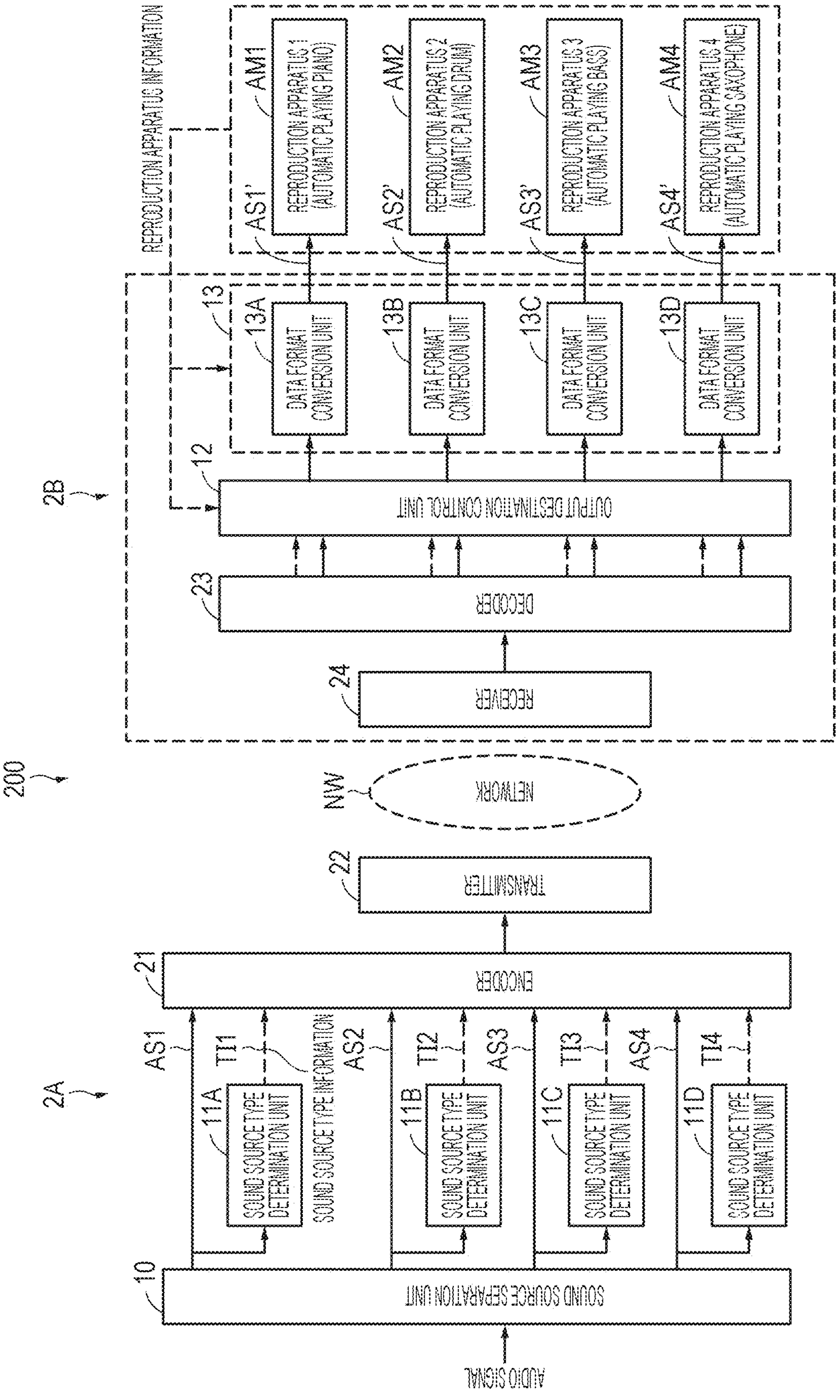
FIG. 7 is a diagram illustrating a reproduction system according to a second embodiment.

FIG. 7 is a diagram illustrating a reproduction system (reproduction system 200) according to the second embodiment. The reproduction system 200 includes a transmission apparatus 2A and a reception apparatus 2B connected to the transmission apparatus 2A via a network NW such as the Internet. As the transmission apparatus 2A, a cloud server or the like is assumed. The transmission apparatus 2A stores a plurality of audio signals. The audio signal selected by the user is distributed from the transmission apparatus 2A to the reception apparatus 2B and supplied from the reception apparatus 2B to the output device. The output device performs streaming reproduction or download reproduction of the distributed audio signal. Similarly to the first embodiment, the output devices are, for example, an automatic playing piano AM1, an automatic playing drum AM2, an automatic playing bass AM3, and an automatic playing saxophone AM4.

The transmission apparatus 2A has a sound source separation unit 10 and a sound source type determination unit 11 (sound source type determination units 11A, 11B, 11C, and 11D). Furthermore, the transmission apparatus 2A has an encoder 21 and a transmitter 22. The encoder 21 generates a predetermined bit stream. The transmitter 22 has an antenna, a modulation circuit, and the like compatible with a communication system. That is, the transmission apparatus 2A is also an encoding apparatus having the encoder 21.

The reception apparatus 2B has an output destination control unit 12 and a data format conversion unit 13 (data format conversion units 13A, 13B, 13C, and 13D). Furthermore, the reception apparatus 2B has a decoder 23 and a receiver 24. The decoder 23 decodes the bit stream transmitted from the transmission apparatus 2A. The receiver 24 has an antenna, a demodulation circuit, and the like compatible with a communication system.

Next, operations of both of the transmission apparatus 2A and the reception apparatus 2B will be described. The operations of the sound source separation unit 10 and the sound source type determination unit 11 are similar to those of the first embodiment. The sound source signals AS1 to AS4 subjected to the sound source separation by the sound source separation unit 10 are input into the encoder 21. Moreover, sound source type information indicating the type of the sound source signal determined by the sound source type determination unit 11 is input into the encoder 21. Specifically, sound source type information TI1 indicating “piano” which is the type of the musical instrument to which the sound source signal AS1 corresponds, sound source type information 112 indicating “drum” which is the type of the musical instrument to which the sound source signal AS2 corresponds, sound source type information 113 indicating “bass” which is the type of the musical instrument to which the sound source signal AS3 corresponds, and sound source type information 114 indicating “saxophone” which is the type of the musical instrument to which the sound source signal AS4 corresponds are input into the encoder 21 in association with the respective sound source signals.

The encoder 21 encodes the plurality of sound source signals AS1 to AS4, and generates a bit stream including the sound source type information TI1 to 114 indicating the type of each of the plurality of sound source signals and information indicating the reproduction position of each of the plurality of sound source signals. The information indicating the reproduction position for each sound source signal may be included in the audio signal before sound source separation, or may be set on the transmission apparatus 2A side. The bit stream generated by the encoder 21 is transmitted to the reception apparatus 2B via the transmitter 22.

The bit stream transmitted from the transmission apparatus 2A is supplied to a decoder 23 via a receiver 24. The decoder 23 decodes the bit stream. Accordingly, the plurality of sound source signals AS1 to AS4, the sound source type information TI1 to 114 indicating the type of each of the plurality of sound source signals, and the information indicating the reproduction position of each of the plurality of sound source signals are obtained. Each piece of data obtained by the decoding process by the decoder 23 is supplied to an output destination control unit 12.

Similarly to the first embodiment, the output destination control unit 12 controls the output destination of each sound source signal. For example, by referring to the sound source type information T1, the output destination control unit 12 can distinguish that the sound source signal AS1 corresponds to a sound source signal for "piano". Therefore, the output destination control unit 12 assigns the sound source signal AS1 to the automatic playing piano AM1 and sets the reproduction gain. Then, the sound source signal AS1 is converted into a data format that can be reproduced by the automatic playing piano AM1 by a data format conversion unit 13A, and a sound source signal AS1' is generated. The sound source signal AS1' is reproduced from the automatic playing piano AM1. By performing similar processing on other sound source signals, sound is reproduced from an appropriate automatic playing musical instrument.

Note that, in the present embodiment, the bit stream generated by the encoder 21 includes information indicating the reproduction position of each sound source signal. Each automatic playing musical instrument may be moved to an appropriate position on the basis of information indicating the reproduction position for each sound source signal. The movement of the automatic playing musical instrument can be manually performed, for example, by visualizing the information indicating the reproduction position for each sound source signal. Moreover, each automatic playing musical instrument may autonomously move such that its own position becomes information indicating a reproduction position for each sound source signal by performing communication or the like with each other. In this case, processing for converting the information indicating the reproduction position for each sound source signal into a data format recognizable by the automatic playing musical instrument may be performed by the data format conversion unit 13.

According to the present embodiment, the effects similar to those of the first embodiment can be obtained.

Furthermore, it is possible to perform highly accurate sound source separation by utilizing abundant calculation resources of cloud equipment.

Moreover, the user can have an environment similar to an environment in which a professional performer plays a musical instrument on the spot, and can reproduce various types of music stored in the cloud equipment in the environment.

Third Embodiment

Next, a third embodiment will be described. Note that, in the description of the third embodiment, the same or similar configurations in the above description are denoted by the same reference signs, and redundant description is omitted as appropriate. Moreover, the items described in the above embodiments can be applied to the third embodiment unless otherwise specified.

Figure 8:
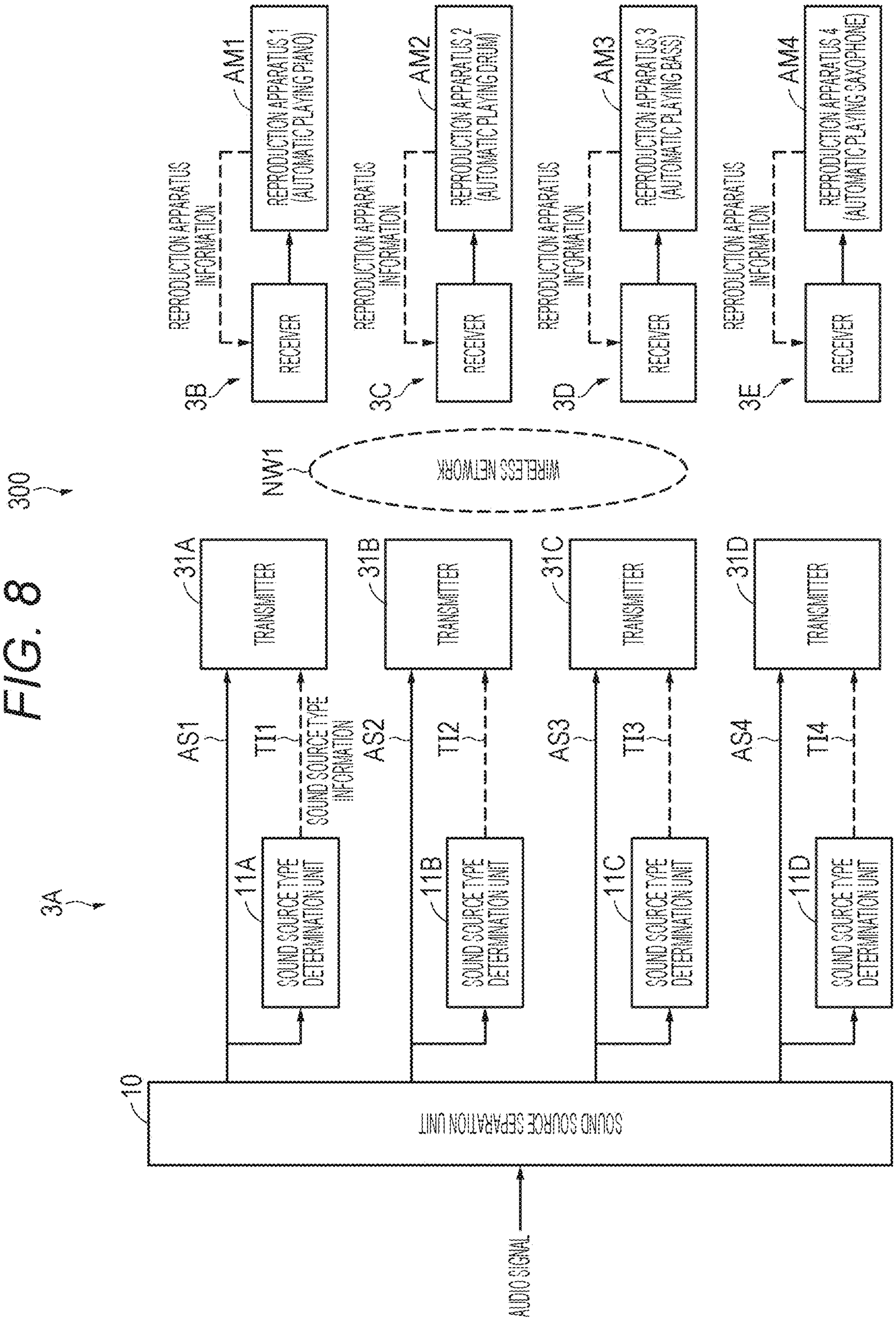
FIG. 8 is a diagram illustrating a reproduction system according to a third embodiment.

FIG. 8 is a diagram illustrating a reproduction system (reproduction system 300) according to the third embodiment. The reproduction system 300 has a transmission apparatus 3A and four receivers (receiver 3B to receiver 3E). The receiver 3B is integrated with, for example, the automatic playing piano AM1. The receiver 3C is integrated with, for example, the automatic playing drum AM2. The receiver 3D is integrated with, for example, the automatic playing bass AM3. The receiver 3E is integrated with, for example, the automatic playing saxophone AM4. Note that each receiver may be attachable to and detachable from the automatic playing musical instrument. Each of the receivers 3B to 3E has the function of the output destination control unit 12 and the function of the data format conversion unit 13 described above.

The transmission apparatus 3A has a sound source separation unit 10, a sound source type determination unit (sound source type determination units 11A to 11D), and a transmitter 31. The transmitter 31 includes transmitters 31A to 31D, and is provided so as to be compatible with the sound source signal and each sound source type determination unit.

The transmission apparatus 3A and each receiver are connected via a network NW1. The network NW1 is, for example, a short-range wireless communication network such as IEEE802.11 a/b/g/n or Bluetooth (registered trademark).

Next, the transmission apparatus 3A and each receiver in the reproduction system 300 will be described. The sound source signal AS1 obtained by the sound source separation of the sound source separation unit 10 is supplied to the transmitter 31A. Moreover, the sound source type information TI1 of the sound source signal AS1 is supplied to the transmitter 31A. The sound source signal AS2 obtained by the sound source separation of the sound source separation unit 10 is supplied to the transmitter 31B. Furthermore, the sound source type information TI2 of the sound source signal AS2 is supplied to the transmitter 31B. The sound source signal AS3 obtained by the sound source separation of the sound source separation unit 10 is supplied to the transmitter 31C. Further, the sound source type information T13 of the sound source signal AS3 is supplied to the transmitter 31C. The sound source signal AS4 obtained by the sound source separation of the sound source separation unit 10 is supplied to the transmitter 31D. Moreover, the sound source type information TI4 of the sound source signal AS4 is supplied to the transmitter 31D. Each receiver can distinguish the type of the automatic playing musical instrument to which the receiver is connected on the basis of the reproduction apparatus information.

In the present embodiment, pairing is performed between the transmitter 31 of the transmission apparatus 3A and each receiver. Pairing is performed, for example, as follows. The transmitter 31A broadcasts a search signal for searching for a receiver of which the type of the automatic playing musical instrument is "piano" via the network NW1. Among the search signals, only the receiver 3B whose reproduction apparatus information is "piano" transmits a response signal to the transmitter 31A. As a result, the transmitter 31A and the receiver 3B are paired. Similarly, the transmitter 31B and the receiver 3C, the transmitter 31C and the receiver 3D, and the transmitter 31D and the receiver 3E are each paired. As a matter of course, pairing may be performed by other methods.

The transmitter 31A transmits the sound source signal AS1 to the receiver 3B. The receiver 3B converts the received sound source signal AS1 into a data format that can be reproduced by the automatic playing piano AM1, and outputs the converted sound source signal AS1' to the automatic playing piano AM1. Then, sound is reproduced from the automatic playing piano AM1. In this manner, the receiver 3B paired with the transmitter 31A outputs the sound source signal AS1 (more specifically, the sound source signal AS1' subjected to the data format conversion) to the corresponding automatic playing piano AM1 on the basis of the determination result of the sound source type determination unit 11. Other transmitters and receivers operate in a similar manner. Accordingly, the sound source signals AS1 to AS4 are reproduced from the corresponding automatic playing musical instruments.

Note that, as described in the second embodiment, the present embodiment can be configured such that an apparatus that has received data from cloud equipment further transmits the data to an automatic playing musical instrument having a receiver.

For example, in a case where orchestral performance using a plurality of automatic playing musical instrument is performed, a large number of connection cables are required in a wired connection form, and the arrangement becomes troublesome. In the present embodiment, the cable can be eliminated by wireless connection. As a result, it is possible to easily change the arrangement of the automatic playing musical instruments, and it is also possible to arrange the automatic playing musical instruments at any positions without being restricted by the cable.

Fourth Embodiment

Next, a fourth embodiment will be described. Note that, in the description of the fourth embodiment, the same or similar configurations in the above description are denoted by the same reference signs, and redundant description is omitted appropriate. And, the items described in the above embodiments can be applied to the fourth embodiment unless otherwise specified.

In the first to third embodiments described above, an example has been described in which the automatic playing musical instrument corresponding to the separated sound source signal is connected to the signal processing apparatus 1. However, there may be a case where there is not necessarily an automatic playing musical instrument corresponding to the separated sound source signal, that is, there may be a case where the separated sound source signal and the automatic playing musical instrument do not correspond one-to-one. The present embodiment is an embodiment corresponding to such a case.

Figures 9, 10:
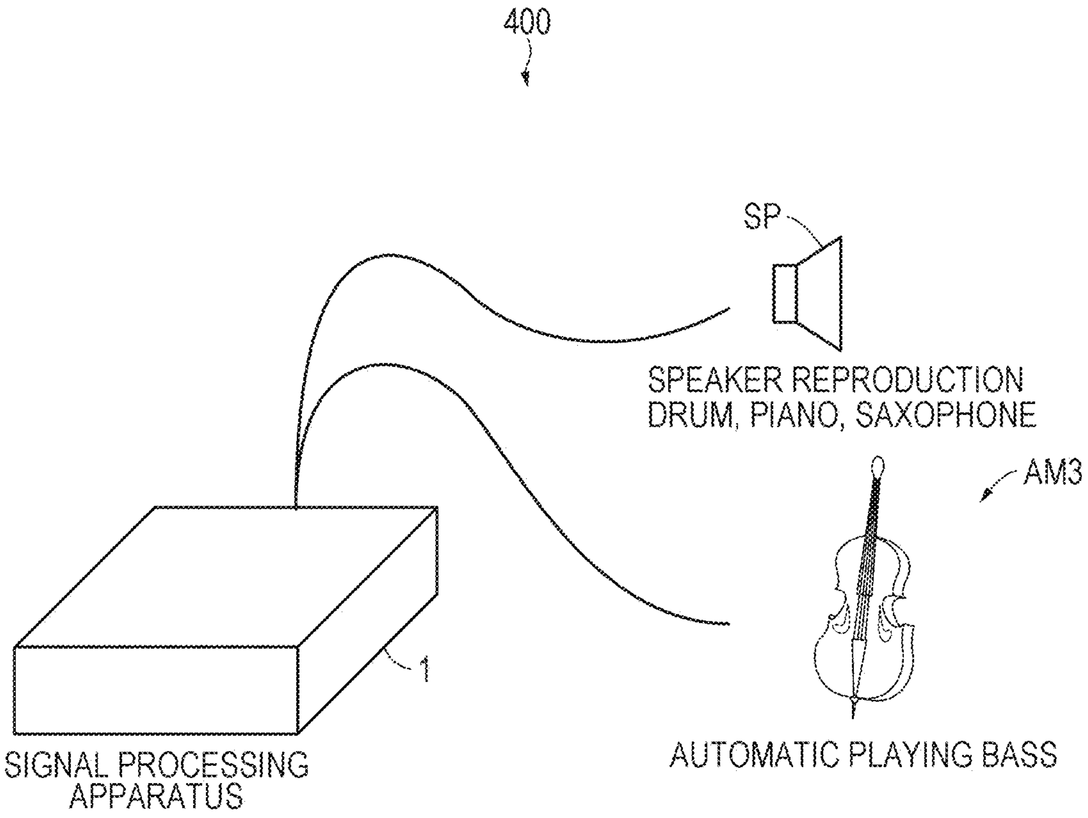
FIG. 9 is a diagram illustrating a reproduction system according to a fourth embodiment.
FIG. 10 is a diagram illustrating one example of a table indicating reproduction gains according to the fourth embodiment.

FIG. 9 is a diagram illustrating a reproduction system (reproduction system 400) according to the fourth embodiment. In the reproduction system 400, only the automatic playing bass AM3 is connected to the signal processing apparatus 1 described above. Moreover, an output device different from the automatic playing musical instrument, for example, a speaker SP is connected to the signal processing apparatus 1.

Similarly to the first embodiment, an output destination control unit 12 of the signal processing apparatus 1 outputs a sound source signal AS3 obtained by sound source separation to the automatic playing bass AM3. On the other hand, the output destination control unit 12 judges that the automatic playing musical instrument that outputs sound source signals AS1, AS2, and AS4 is not connected to the signal processing apparatus 1 on the basis of sound source type information and reproduction apparatus information. In this case, the output destination control unit 12 outputs sound source signals AS1, AS2, and AS4 from the speaker SP.

For example, the output destination control unit 12 sets the gain for each sound source signal with reference to the table TA1 illustrated in FIG. 10. For example, since it is unnecessary to output the sound source signal AS3 to the speaker SP, "mute " is set as the gain of the sound source signal AS3 for the speaker SP. Moreover, since the sound source signals AS1, AS2, and AS4 are signals to be reproduced from the speaker SP, "0.33" or "0.34" is set as the gain of each of the sound source signals AS1, AS2, and AS4 for the speaker SP. This gain is an example of a case where the mixing ratios of each of the sound source signals are substantially equal. The sound source signals AS1, AS2, and AS4 are converted into analog signals by a data format conversion unit 13 and then reproduced from the speaker SP.

Meanwhile, it is not preferable that the sound source signal output to the automatic playing bass AM3 include a sound source signal of another musical instrument. Therefore, as the gain for the automatic playing bass AM3, only the gain of the sound source signal AS3 is set to "1.0", and the gains of the other sound source signals are set to "mute".

Figure 11:
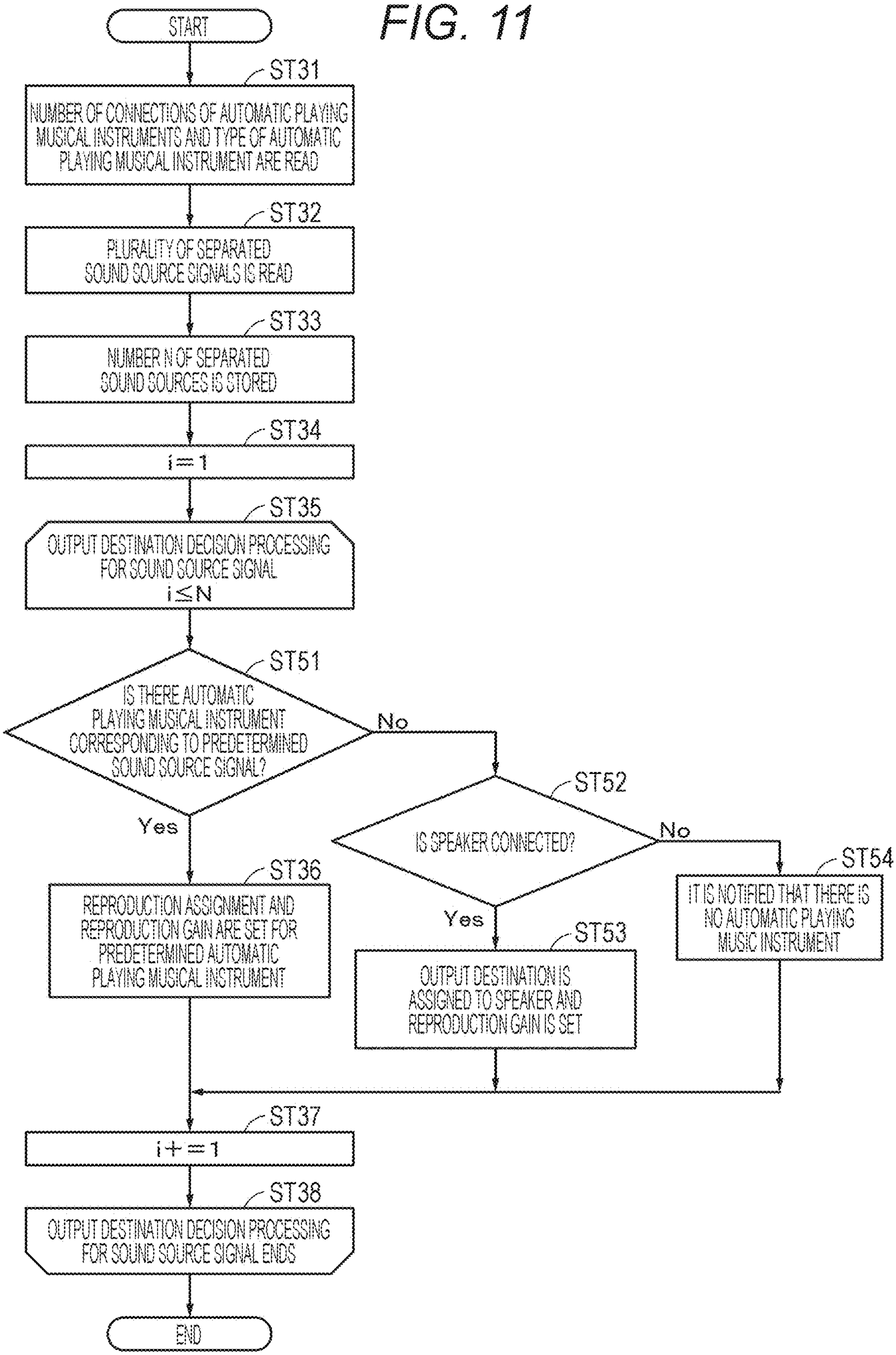
FIG. 11 is a flowchart that is referred to when one example of processing performed by a signal processing apparatus according to the fourth embodiment is explained.

FIG. 11 is a flowchart illustrating a flow of processing performed by the signal processing apparatus 1 according to the fourth embodiment. Note that the processing according to steps ST31 to ST38 in the flowchart illustrated in FIG. 11 has already been described, and thus redundant description will be omitted.

Following the processing of step ST35, processing according to step ST51 is performed. In step ST51, the output destination control unit 12 judges whether or not there is an automatic playing musical instrument for a separated predetermined sound source signal on the basis of reproduction apparatus information. In a case where there is an automatic playing musical instrument, the processing proceeds to step ST36. In the present embodiment, since there is no automatic playing musical instrument for each of the sound source signals AS1, AS2, and AS4, the processing proceeds to step ST52.

In step ST52, the output destination control unit 12 judges whether or not a speaker is connected to the signal processing apparatus 1. The output destination control unit 12 judges the presence or absence of a speaker, for example, by detecting a physical connection. In the present embodiment, since the speaker SP is connected to the signal processing apparatus 1, the processing proceeds to step ST53.

In step ST53, the output destinations of the sound source signals AS1, AS2, and AS4 are assigned to the speaker SP, and, for example, the gain of each sound source signal is set on the basis of the table TA1. Then, the processing proceeds to step ST37.

Note that, in a case where a speaker is not connected to the signal processing apparatus 1 (judgement in step ST52 is No), the processing proceeds to step ST54. In step ST54, since there is no output device for the predetermined sound source signal and the sound source signals AS1, AS2, and AS4, the output levels thereof are set to mute, and the user is notified that these sound source signals are not to be output by voice, character display, or the like. For example, a message "piano, drum, and saxophone sounds cannot be reproduced" is displayed. The signal processing apparatus 1 may have a display for performing such display.

According to the fourth embodiment described above, even in a case where only some of the automatic playing musical instruments are connected to the signal processing apparatus 1, only the corresponding sound source signal can be output to the automatic playing musical instrument. Furthermore, by reproducing the sound source signal to which the corresponding automatic playing musical instrument is not connected from the speaker SP, orchestral performance can be performed even in a case where only some automatic playing musical instruments are present.

Note that, in the present embodiment, an example has been described in which the gains for the respective sound source signals AS1, AS2, and AS4 are set substantially equally, but the gains for the respective sound source signals can be set as appropriate. Furthermore, in the present embodiment, the gain of the sound source signal AS3 for the speaker SP is set to "mute", but a gain other than "mute" may be set as the gain of the sound source signal AS3 in consideration of the balance of the reproduction sound. Moreover, the speaker SP may be a speaker wirelessly connected to the signal processing apparatus 1.

Fifth Embodiment

Next, a fifth embodiment will be described. Note that, in the description of the fifth embodiment, the same or similar configurations in the above description are denoted by the same reference signs, and redundant description is omitted as appropriate. And, the items described in the above embodiments can be applied to the fifth embodiment unless otherwise specified.

The present embodiment is an embodiment assuming a mode in which the user plays a part of the automatic playing musical instrument by himself/herself in a case where some automatic playing musical instruments cannot be prepared, and a mode in which the user plays a part of some automatic playing musical instruments by himself/herself to practice while listening to performances of other automatic playing musical instruments.

Figure 12:
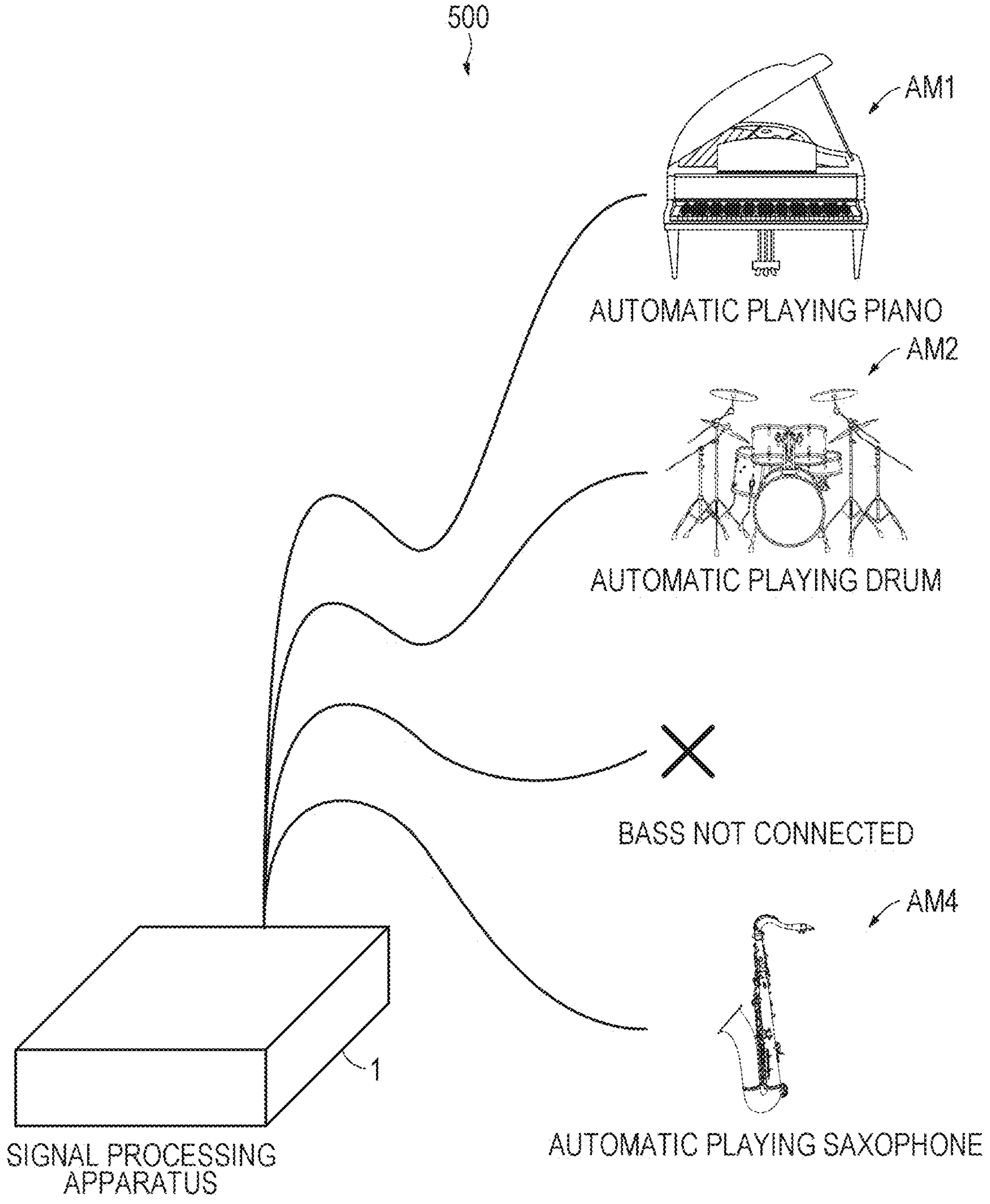
FIG. 12 is a diagram illustrating a reproduction system according to a fifth embodiment.

FIG. 12 is a diagram illustrating a reproduction system (reproduction system 500) according to the fifth embodiment. In the reproduction system 500, for example, it is an example in which the automatic playing bass AM3 is not connected to the signal processing apparatus 1. In the reproduction system 500, the sound source signal AS1 with the sound source separated is reproduced by the automatic playing piano AM1, the sound source signal AS2 is reproduced by the automatic playing drum AM2, and the sound source signal AS4 is reproduced from the automatic playing saxophone AM4. The sound source signal AS3 is not reproduced because there is no automatic playing bass AM3 and no speaker is connected to the signal processing apparatus 1. In this case, the user can play the bass part by herself/himself while reproducing the sound source signals of other instruments with the automatic playing musical instrument.

Figures 13, 14:
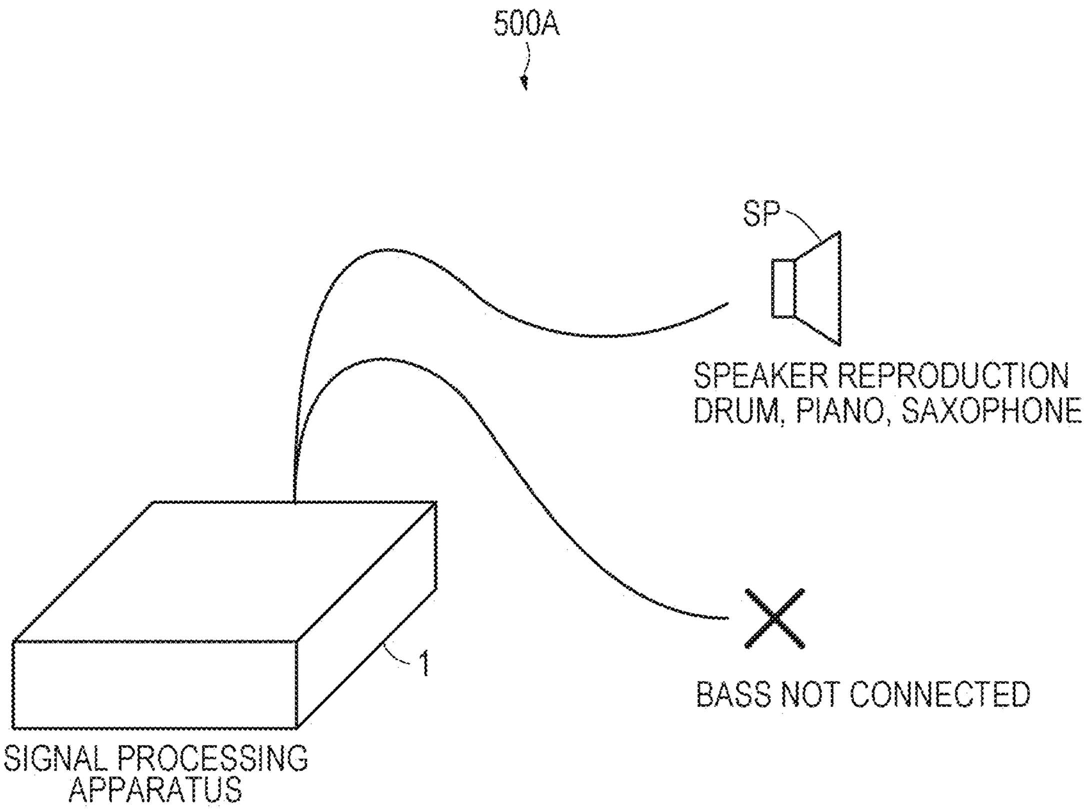
FIG. 13 is a diagram illustrating a reproduction system according to another embodiment of the fifth embodiment.
FIG. 14 is a diagram illustrating one example of a table indicating reproduction gains according to the fifth embodiment.

FIG. 13 is a diagram illustrating a reproduction system (reproduction system 500A) according to another embodiment of the present embodiment. The reproduction system 500A is an example assuming an aspect in which the user himself/herself performs practice of a predetermined musical instrument, for example, a bass. In the reproduction system 500A, the sound source signals AS1, AS2, and AS4 subjected to sound source separation are reproduced by a speakers or headphones. Furthermore, the user plays the bass by herself/himself to practice the bass. Since it is unnecessary to output the sound source signal for the musical instrument to be practice, the output destination control unit 12 refers to the table TA2 illustrated in FIG. 14 and sets the gain for the sound source signal AS3 to "mute". Note that the gains for the sound source signals AS1, AS2, and AS4 reproduced from the speaker are not substantially equally limited, and can be set as appropriate. Moreover, in order for the user to recognize a sample sound, the gain may be set such that the sound source signal AS3 is reproduced from the speaker or the headphone.

Sixth Embodiment

Next, a sixth embodiment will be described. Note that, in the description of the sixth embodiment, the same or similar configurations in the above description are denoted by the same reference signs, and redundant description is omitted as appropriate. And, the items described in the above embodiments can be applied to the sixth embodiment unless otherwise specified.

Since the output devices exemplified in the above-described embodiments, specifically, the automatic playing musical instrument, the speaker, and the headphone have different structures of the sound producing mechanism, delay (latency) from reception of an input to emission of a sound is different. For example, an automatic playing piano has a structure in which a piano hammer is mechanically driven from an input signal to vibrate a string, whereas, in the case of an automatic playing bass, a piezoelectric element is vibrated by an electric signal to convey vibration to the string. Meanwhile, the speaker converts the electric signal into sound vibration with a voice coil. As described above, since the sound producing mechanism and the mechanism are different, in a case where a plurality of types of output devices is used, a difference in latency affects, and a shift occurs between each of reproduction timings of sounds. The present embodiment is an embodiment for such a case.

Figure 15:
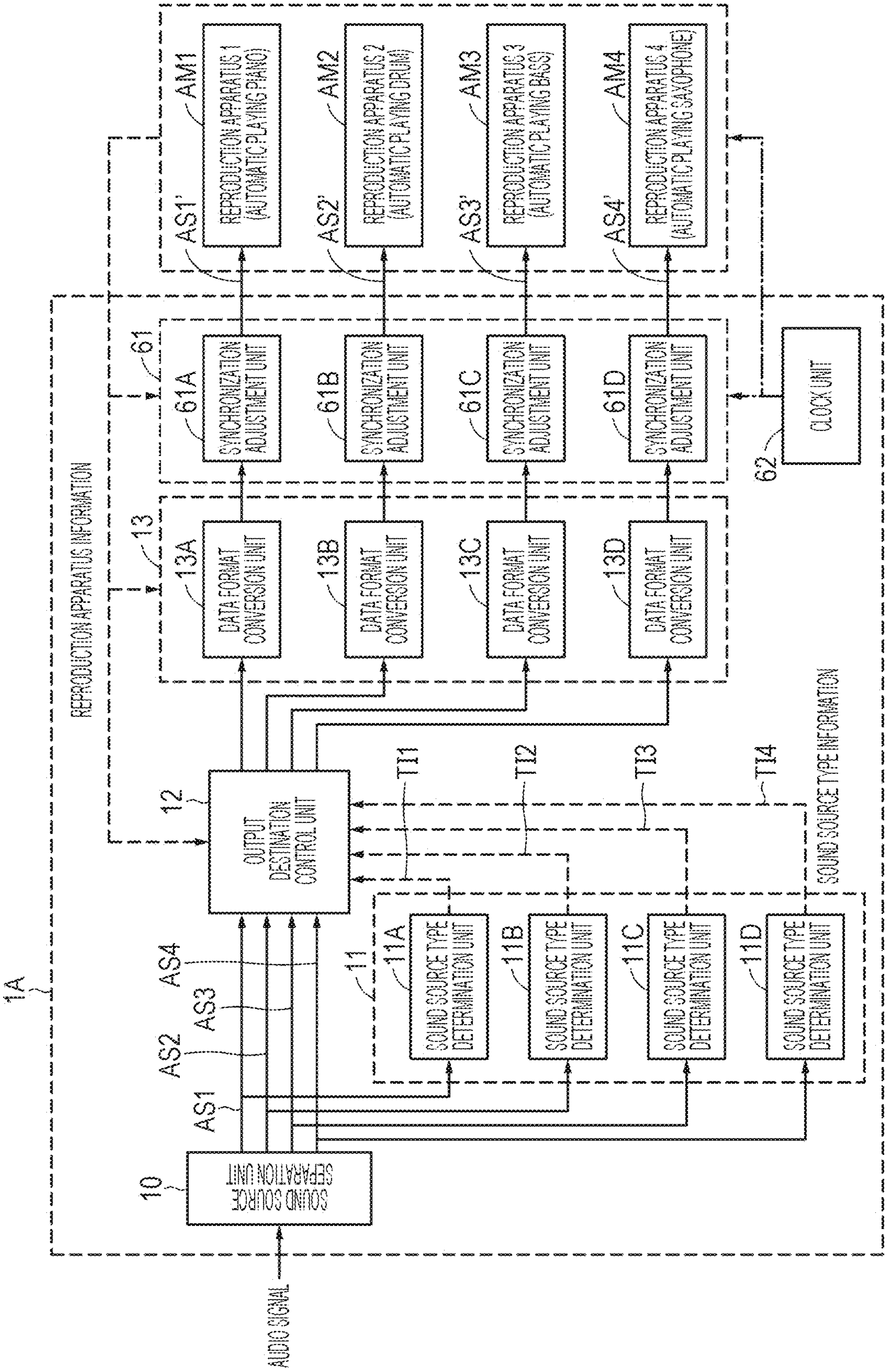
FIG. 15 is a diagram for explaining an internal configuration example of a signal processing apparatus according to a sixth embodiment.

FIG. 15 is a diagram illustrating a configuration example of a signal processing apparatus (signal processing apparatus 1A) according to a sixth embodiment. The signal processing apparatus 1A has a synchronization adjustment unit 61 unlike the signal processing apparatus 1 according to the first embodiment and the like. The synchronization adjustment unit 61 is provided so as to correspond to each output sound source signal. The synchronization adjustment unit 61A sets a delay amount of the sound source signal reproduced by the automatic playing piano AM1. The synchronization adjustment unit 61B sets a delay amount of the sound source signal reproduced by the automatic playing drum AM2. The synchronization adjustment unit 61C sets the delay amount of the sound source signal reproduced by the automatic playing bass AM3. The synchronization adjustment unit 61D sets the delay amount of the sound source signal reproduced by the automatic playing saxophone AM4.

Furthermore, the signal processing apparatus 1A has a clock unit 62. The clock unit 62 generates a clock signal serving as a reference. The clock signal generated by the clock unit 62 is supplied to the synchronization adjustment unit 61. Each of the synchronization adjustment units 61A to 61D of the synchronization adjustment unit 61 receives a latency time unique to each output device (in the present embodiment, each automatic playing musical instrument) and performs adjustment so that sounds output from all the automatic playing musical instruments are synchronized. The unique latency time is included, for example, in the reproduction apparatus information. Specifically, a delay that allows synchronization with an automatic playing musical instrument having a large latency is given to the reproduction timing of the automatic playing musical instrument having a small latency.

Note that the latency unique to each output device can be obtained in advance by measurement. However, since each of the automatic playing musical instruments is a musical instrument, the latency may change for each individual and for each environment due to various influences such as manufacturing variations of the individual, differences in materials (wood, metal, diaphragm, and the like), contraction due to temperature and humidity, and ageing. Therefore, there is a possibility that an error from the latency time measured in advance occurs. In order to cope with this, a sound pickup apparatus (e.g., a microphone) may be provided. The sound pickup apparatus may be integrated with or separated from the signal processing apparatus 1A. The sound pickup apparatus is installed in the same space as the output device. Then, each separated sound source is reproduced by the output device, and the sound mixed in the space is acquired by the sound pickup apparatus. The observation mixed sound is compared with the original audio data which is an input signal to the signal processing apparatus 1A, and synchronization adjustment can be performed by using the comparison result. For example, adjustment regarding the reproduction timing of each sound source signal is performed by increasing or decreasing the delay time for each sound source signal so as to minimize the squared error between the two signals.

According to the present embodiment, even if each output device has different latency, it is possible to synchronize each reproduced sound source signal. Therefore, a sound without distortion can be obtained, and it is possible to prevent the user from feeling uncomfortable.

Modification Example

Although the plurality of embodiments of the present disclosure has been specifically described above, the contents of the present disclosure are not limited to the above-described embodiments, and various modifications are possible based on the technical idea of the present disclosure.

Figure 16:
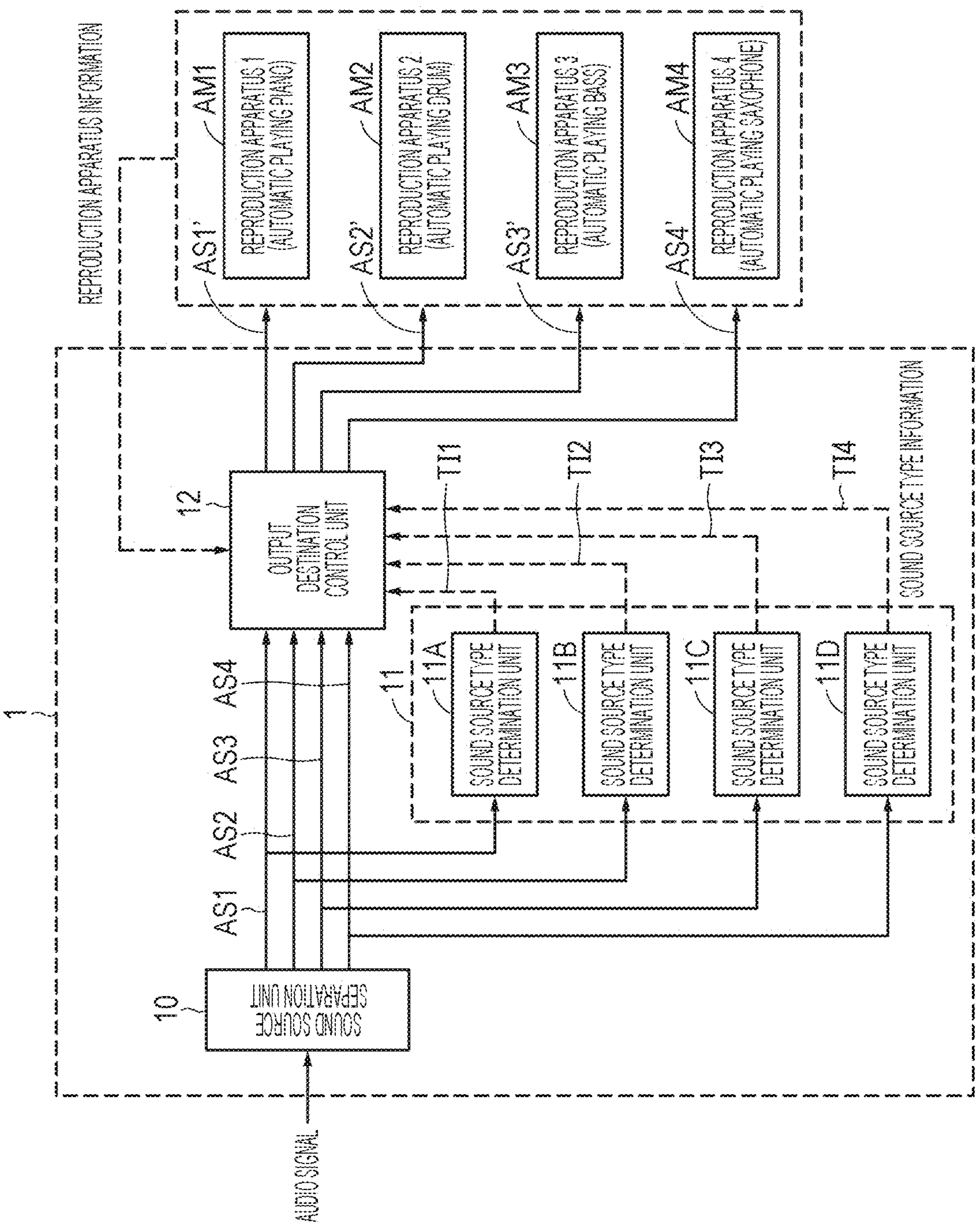
FIG. 16 is a diagram for explaining a modification example.

For example, an automatic playing musical instrument may be able to reproduce sound on the basis of directly input audio signals. As an example of such an automatic playing musical instrument, a drum or the like in which a piezoelectric element vibrates on the basis of a directly input audio signal to reproduce sound is assumed. In this case, as illustrated in FIG. 16, the signal processing apparatus 1 may be not having the data format conversion unit 13. Furthermore, the reproduction apparatus information may include information indicating whether or not conversion of the data format is necessary, and the data format conversion unit 13 may be controlled not to operate in a case where conversion of the data format is unnecessary.

In the above-described embodiments, since the reproduction sound in the actual space can be observed by the sound pickup apparatus, the sound quality may be adjusted using this observation mixed sound. For example, the synchronization adjustment unit 61 adjusts sound quality in addition to the function of synchronization adjustment. Specifically, the synchronization adjustment unit 61 may adjust the volume of each automatic playing musical instrument or adjust the frequency characteristics.

The configurations, methods, steps, shapes, materials, numerical values, and the like described in the above-described embodiments and modification examples are merely examples, and configurations, methods, steps, shapes, materials, numerical values, and the like different from those described above may be used as necessary, or may be replaced with known ones. In addition, the configurations, methods, steps, shapes, materials, numerical values, and the like in the embodiments and the modification examples can be combined with each other within a range in which no technical contradiction occurs.

Note that the contents of the present disclosure are not to be construed as being limited by the effects exemplified in the present specification.

The present disclosure can also adopt the following configurations.

(1)

A signal processing apparatus including:

a sound source separation unit configured to perform sound source separation on a mixed sound signal obtained by mixing a plurality of sound source signals;

a sound source type determination unit configured to determine a type of a predetermined sound source signal obtained by the sound source separation; and an output destination control unit configured to output the predetermined sound source signal to a corresponding output device on the basis of a determination result of the sound source type determination unit.

(2)

The signal processing apparatus according to (1), further including a data format conversion unit configured to convert the predetermined sound source signal into a data format reproducible by the output device.

(3)

The signal processing apparatus according to (1) or (2), in which the output destination control unit acquires reproduction apparatus information including at least a type of the output device, and decides an output device that outputs the predetermined sound source signal on the basis of the type of the predetermined sound source signal and the type of the output device indicated by the reproduction apparatus information.

(4)

The signal processing apparatus according to any one of (1) to (3), in which a plurality of sound source signals is obtained by the sound source separation, and the output destination control unit outputs each of the plurality of the sound source signals to a corresponding output device.

(5)

The signal processing apparatus according to (4), in which, in a case where one sound source signal of the plurality of the sound source signals is output to a predetermined output device, the output destination control unit sets an output level of another sound source signal corresponding to the predetermined output device to mute.

(6)

The signal processing apparatus according to any one of (1) to (5), in which the output device includes at least one of an automatic playing musical instrument, a speaker, or a headphone.

(7)

The signal processing apparatus according to (6), in which the output device includes an automatic playing musical instrument and a speaker, and the output destination control unit outputs the predetermined sound source signal to the speaker in a case where the automatic playing musical instrument that outputs the predetermined sound source signal does not exist.

(8)

The signal processing apparatus according to (7), in which the output destination control unit outputs a plurality of sound source signals from the speaker in a case where there is the plurality of the sound source signals in which the automatic playing musical instrument to be output does not exist.

(9)

The signal processing apparatus according to (8), in which an output level of each of the plurality of the sound source signals output from the speaker can be set.

(10)

The signal processing apparatus according to any one of (7) to (9), in which, in a case where the speaker does not exist, the output destination control unit sets an output level of the predetermined sound source signal to mute and performs notification that the predetermined sound source signal is not output.

(11)

The signal processing apparatus according to (4) or (5), further including a synchronization adjustment unit configured to set a delay amount for reproduction timing of each of the plurality of sound source signals.

(12)

The signal processing apparatus according to (11), in which the synchronization adjustment unit compares the mixed sound signal with a mixed sound signal which includes the predetermined sound source signal, is reproduced from the output device, and is collected by a sound pickup apparatus, and sets the delay amount for each of the plurality of the sound source signals on the basis of a comparison result.

(13)

The signal processing apparatus according to any one of (1) to (12), in which processing by the sound source type determination unit is passed in a case where the predetermined sound source signal is obtained by the sound source separation by the sound source separation unit and the type of the predetermined sound source signal is determined.

(14)

A signal processing method including:

performing, by a sound source separation unit, sound source separation on a mixed sound signal obtained by mixing a plurality of sound source signals;

determining, by a sound source type determination unit, a type of a predetermined sound source signal obtained by the sound source separation; and outputting, by an output destination control unit, the predetermined sound source signal to a corresponding output device on the basis of a determination result of the sound source type determination unit.

(15)

A program causing a computer to execute a signal processing method including:

performing, by a sound source separation unit, sound source separation on a mixed sound signal obtained by mixing a plurality of sound source signals;

determining, by a sound source type determination unit, a type of a predetermined sound source signal obtained by the sound source separation; and outputting, by an output destination control unit, the predetermined sound source signal to a corresponding output device on the basis of a determination result of the sound source type determination unit.

(16)

A signal processing system including:

a transmission apparatus; and a reception apparatus, in which the transmission apparatus includes:

a sound source separation unit configured to perform sound source separation on a mixed sound signal obtained by mixing a plurality of sound source signals; and a sound source type determination unit configured to determine a type of a predetermined sound source signal obtained by the sound source separation, and the reception apparatus is configured to output the predetermined sound source signal to an output device for the type determined by the sound source type determination unit.

(17)

An encoding apparatus including an encoding unit that encodes a plurality of sound source signals obtained by performing sound source separation on a mixed sound signal obtained by mixing the plurality of the sound source signals, and generates a bit stream including sound source type information indicating a type of each of the plurality of the sound source signals and information indicating a reproduction position of each of the plurality of the sound source signals.

REFERENCE SIGNS LIST

1, 1A Signal processing apparatus
10 Sound source separation unit
11(11A to 11D) Sound source type determination unit
12 Output destination control unit
13(13A to 13D) Data format conversion unit
21 Encoder
61(61A to 61D) Synchronization adjustment unit
100, 200, 300, 400, 500, 500AReproduction system
AM1 Automatic playing piano
AM2 Automatic playing drum
AM3 Automatic playing bass
AM4 Automatic playing saxophone

The invention claimed is:

1. A signal processing apparatus comprising:

circuitry configured to: perform sound source separation on a mixed sound signal obtained by mixing a plurality of sound source signals;

determine a type of a predetermined sound source signal obtained by the sound source separation; and output the predetermined sound source signal to a corresponding output device in a plurality of output devices on a basis of the type of the predetermined sound source signal, wherein the circuitry acquires reproduction apparatus information indicating a type of each of the plurality of output devices, and decides the corresponding output device that outputs the predetermined sound source signal by matching the type of the predetermined sound source signal with the type of the corresponding output device indicated by the reproduction apparatus information, wherein the plurality of output devices includes at least one automatic playing musical instrument, wherein the plurality of output devices includes a speaker separate from the automatic playing musical instruments, and wherein the plurality of output devices includes a headphone separate from the automatic playing musical instruments, wherein the circuitry is connected to the plurality of output devices by wire or by wireless connections.

2. The signal processing apparatus according to claim 1, further configured to convert the predetermined sound source signal into a data format reproducible by the output device.

3. The signal processing apparatus according to claim 1, wherein a plurality of sound source signals is obtained by the sound source separation, and the circuitry outputs each of the plurality of the sound source signals to a corresponding output device.

4. The signal processing apparatus according to claim 3, wherein, in a case where one sound source signal of the plurality of the sound source signals is output to a predetermined output device, the circuitry sets an output level of another sound source signal corresponding to the predetermined output device to mute.

5. The signal processing apparatus according to claim 1, wherein the output device includes an automatic playing musical instrument and a speaker, and the circuitry outputs the predetermined sound source signal to the speaker in a case where the automatic playing musical instrument that outputs the predetermined sound source signal does not exist.

6. The signal processing apparatus according to claim 5, wherein the circuitry outputs a plurality of sound source signals from the speaker in a case where there is the plurality of the sound source signals in which the automatic playing musical instrument to be output does not exist.

7. The signal processing apparatus according to claim 6, wherein an output level of each of the plurality of the sound source signals output from the speaker can be set.

8. The signal processing apparatus according to claim 5, wherein, in a case where the speaker does not exist, the circuitry sets an output level of the predetermined sound source signal to mute and performs notification that the predetermined sound source signal is not output.

9. The signal processing apparatus according to claim 3, further configured to set a delay amount for reproduction timing of each of the plurality of sound source signals.

10. The signal processing apparatus according to claim 9, wherein the circuitry compares the mixed sound signal with a mixed sound signal which includes the predetermined sound source signal, is reproduced from the output device, and is collected by a sound pickup apparatus, and sets the delay amount for each of the plurality of the sound source signals on a basis of a comparison result.

11. The signal processing apparatus according to claim 1, wherein processing by the circuitry to determine the type is passed in a case where the predetermined sound source signal is obtained by the sound source separation by the circuitry and the type of the predetermined sound source signal is determined.

12. A signal processing method comprising:

performing, by circuitry, sound source separation on a mixed sound signal obtained by mixing a plurality of sound source signals;

determining, by the circuitry, a type of a predetermined sound source signal obtained by the sound source separation; and outputting, by the circuitry, the predetermined sound source signal to a corresponding output device in a plurality of output devices on a basis of the type of the predetermined sound source signal, wherein the circuitry acquires reproduction apparatus information indicating a type of each of the plurality of output devices, and decides the corresponding output device that outputs the predetermined sound source signal by matching the type of the predetermined sound source signal with the type of the corresponding output device indicated by the reproduction apparatus information, wherein the plurality of output devices includes at least one automatic playing musical instrument, wherein the plurality of output devices includes a speaker separate from the automatic playing musical instruments, and wherein the plurality of output devices includes a headphone separate from the automatic playing musical instruments, wherein the circuitry is connected to the plurality of output devices by wire or by wireless connections.

13. A non-transitory computer-readable medium having instructions stored thereon that, when executed by a computer, cause the computer to execute a signal processing method comprising:

performing, by circuitry, sound source separation on a mixed sound signal obtained by mixing a plurality of sound source signals;

determining, by the circuitry, a type of a predetermined sound source signal obtained by the sound source separation; and outputting, by the circuitry, the predetermined sound source signal to a corresponding output device in a plurality of output devices on a basis of the type of the predetermined sound source signal, wherein the circuitry acquires reproduction apparatus information indicating a type of each of the plurality of output devices, and decides the corresponding output device that outputs the predetermined sound source signal by matching the type of the predetermined sound source signal with the type of the corresponding output device indicated by the reproduction apparatus information, wherein the plurality of output devices includes at least one automatic playing musical instrument, wherein the plurality of output devices includes a speaker separate from the automatic playing musical instruments, and wherein the plurality of output devices includes a headphone separate from the automatic playing musical instruments, wherein the circuitry is connected to the plurality of output devices by wire or by wireless connections.

14. A signal processing system comprising:

a transmission apparatus; and a reception apparatus, wherein the transmission apparatus comprises circuitry configured to perform sound source separation on a mixed sound signal obtained by mixing a plurality of sound source signals; and determine a type of a predetermined sound source signal obtained by the sound source separation, and the reception apparatus is configured to output the predetermined sound source signal to a corresponding output device in a plurality of output devices on a basis of the type of the predetermined sound source signal, wherein the reception apparatus acquires reproduction apparatus information indicating a type of each of the plurality of output devices, and decides the corresponding output device that outputs the predetermined sound source signal by matching the type of the predetermined sound source signal with the type of the corresponding output device indicated by the reproduction apparatus information, wherein the plurality of output devices includes at least one automatic playing musical instrument, wherein the plurality of output devices includes a speaker separate from the automatic playing musical instruments, and wherein the plurality of output devices includes a headphone separate from the automatic playing musical instruments, wherein the reception apparatus is connected to the plurality of output devices by wire or by wireless connections.

* * * * *